(12) United States Patent
Jang et al.

(10) Patent No.: US 12,488,213 B2
(45) Date of Patent: Dec. 2, 2025

(54) SMART CARD FOR PERFORMING BIOMETRIC AUTHENTICATION AND METHOD OF OPERATING THE SAME

(71) Applicant: SAMSUNG ELECTRONICS CO., LTD., Suwon-si (KR)

(72) Inventors: Ji-Eun Jang, Suwon-si (KR); Huijun Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 18/540,498

(22) Filed: Dec. 14, 2023

(65) Prior Publication Data
US 2024/0330638 A1    Oct. 3, 2024

(30) Foreign Application Priority Data
Mar. 30, 2023  (KR) .......................... 10-2023-0042264

(51) Int. Cl.
   *G06K 19/073*  (2006.01)
   *G06K 7/00*    (2006.01)
   *G06K 7/016*   (2006.01)

(52) U.S. Cl.
   CPC ..... *G06K 19/07354* (2013.01); *G06K 7/0047* (2013.01); *G06K 7/0166* (2013.01)

(58) Field of Classification Search
   None
   See application file for complete search history.

(56) References Cited

U.S. PATENT DOCUMENTS

| | | | |
|---|---|---|---|
| 5,097,505 A * | 3/1992 | Weiss | G06F 21/34 713/184 |
| 8,113,948 B1 * | 2/2012 | Coronel | G07F 17/3248 705/14.12 |
| 10,332,367 B1 * | 6/2019 | Benkreira | G06F 21/32 |
| 10,474,861 B2 | 11/2019 | Kang et al. | |
| 10,802,643 B2 | 10/2020 | Park et al. | |
| 10,867,228 B2 | 12/2020 | Lowe | |
| 11,151,435 B2 | 10/2021 | Mercier | |
| 2002/0030094 A1 * | 3/2002 | Curry | G06F 1/163 235/375 |
| 2002/0133942 A1 * | 9/2002 | Kenison | G06K 19/07745 29/841 |
| 2004/0232220 A1 * | 11/2004 | Beenau | G06Q 20/4014 235/380 |

(Continued)

FOREIGN PATENT DOCUMENTS

| | | | | |
|---|---|---|---|---|
| CN | 106779947 A | * | 5/2017 | ......... G06Q 30/0645 |
| CN | 115392271 A | * | 11/2022 | |

(Continued)

*Primary Examiner* — Fekadeselassie Girma
(74) *Attorney, Agent, or Firm* — Morgan, Lewis & Bockius LLP

(57) ABSTRACT

A smart card includes a frequency measurement circuit configured to measure a first clock frequency of an external clock signal, a sensor clock output circuit configured to select a first range from a plurality of first clock ranges based on the first clock frequency and to output a sensor clock signal having a second clock frequency corresponding to the first range, and a sensor circuit configured to output sensing data for biometric authentication based on the sensor clock signal and first compensation image data.

18 Claims, 18 Drawing Sheets

(56) References Cited

U.S. PATENT DOCUMENTS

| | | | | |
|---|---|---|---|---|
| 2004/0236701 | A1* | 11/2004 | Beenau | G06F 21/34 |
| | | | | 705/64 |
| 2013/0141217 | A1* | 6/2013 | Goren | G08B 13/2405 |
| | | | | 361/679.01 |
| 2018/0268178 | A1* | 9/2018 | Sugimoto | G06K 19/07771 |
| 2020/0213146 | A1* | 7/2020 | Kodam | G01N 33/0057 |
| 2020/0349538 | A1* | 11/2020 | Glaser | G06K 19/07701 |
| 2021/0064949 | A1 | 3/2021 | Tsai et al. | |
| 2021/0256338 | A1 | 8/2021 | Kollig et al. | |
| 2021/0406629 | A1 | 12/2021 | Jang et al. | |
| 2022/0079439 | A1* | 3/2022 | Heislop | A61B 5/0008 |
| 2023/0056286 | A1* | 2/2023 | Gupta | G06Q 10/06315 |
| 2024/0363232 | A1* | 10/2024 | Masson | G16H 40/20 |

FOREIGN PATENT DOCUMENTS

| | | | | |
|---|---|---|---|---|
| EP | 4495635 A1 * | 1/2025 | | G01S 19/05 |
| KR | 10-1824202 | 2/2018 | | |
| WO | WO-0199075 A2 * | 12/2001 | | G07C 9/00111 |
| WO | WO-2022240622 A1 * | 11/2022 | | G06K 19/0672 |

* cited by examiner

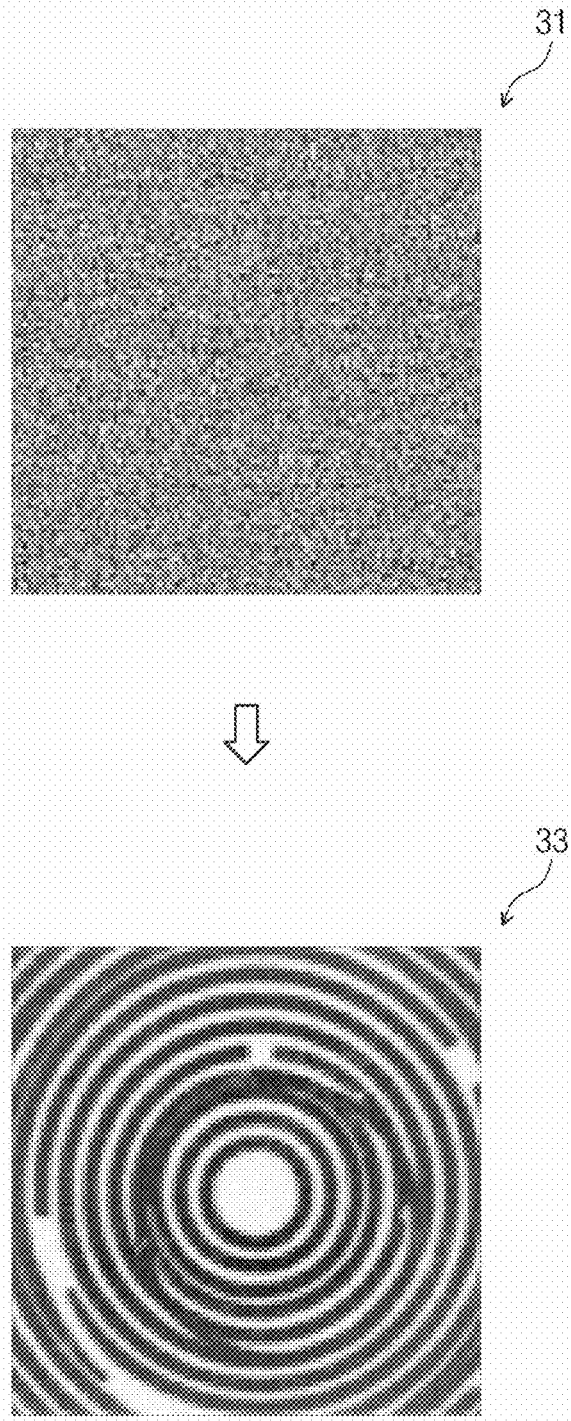

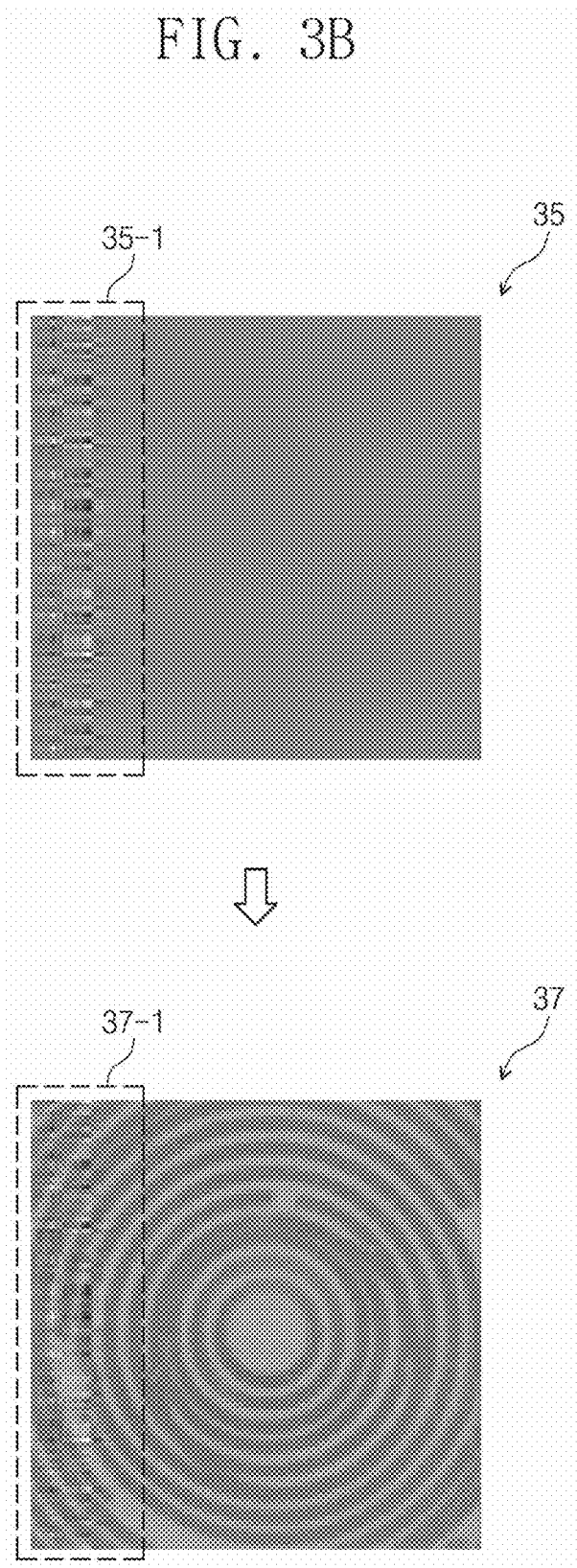

SMART CARD FOR PERFORMING BIOMETRIC AUTHENTICATION AND METHOD OF OPERATING THE SAME

CROSS-REFERENCE TO RELATED APPLICATIONS

This application claims priority under 35 U.S.C. § 119 to Korean Patent Application No. 10-2023-0042264 filed on Mar. 30, 2023, in the Korean Intellectual Property Office, the disclosure of which is incorporated by reference herein in its entirety.

BACKGROUND

Embodiments of the present disclosure described herein relate to a semiconductor device, and more particularly, relate to a smart card performing biometric authentication and a method of operating the smart card.

Nowadays, smart cards utilizing biometric authentication technology are increasing. The smart cards provide a high level of security by using biometric information of the user, such as a fingerprint, a face, an iris, and a vein, along with authentication information stored in the smart card.

The smart cards communicate with card readers in compliance with standards defined by the International Organization for Standardization (ISO). The ISO/IEC (International Organization for Standardization and the International Electrotechnical Commission) 7816 defines contact communication with the card reader, and the ISO/IEC 14443 defines contactless communication with the card reader.

When a smart card communicates with a card reader in a contact manner, the smart card receives an external clock signal from the card reader, and the clock frequency of the external clock signal may be a multiple of the frequency of the sensor clock signal used for biometric authentication. In this case, a noise may be generated in the sensor clock signal. The noise may reduce the performance of a sensor in the smart card. That is, the reliability of the smart card may be reduced.

SUMMARY

Embodiments of the present disclosure provide a smart card improving the reliability of the smart card by minimizing the generation of a noise due to an external clock signal.

Embodiments of the present disclosure provide a method of operating the smart card.

According to some embodiments, a smart card includes a frequency measurement circuit configured to measure a first clock frequency of an external clock signal, a sensor clock output circuit configured to select a first range from a plurality of first clock ranges based on the first clock frequency and to output a sensor clock signal having a second clock frequency corresponding to the first range, and a sensor circuit configured to output sensing data for biometric authentication based on the sensor clock signal and first compensation image data.

According to some embodiments, a method of operating a smart card includes measuring a first clock frequency of an external clock signal, selecting a first range from a plurality of first clock ranges based on the first clock frequency, outputting a sensor clock signal having a second clock frequency corresponding to the first range, and outputting sensing data for biometric authentication based on the sensor clock signal and first compensation image data.

According to some embodiments, a smart card includes a frequency measurement circuit configured to measure a first clock frequency which an external clock signal has, a sensor clock output circuit configured to determine a first reference frequency corresponding to a first range being a clock range including the first clock frequency from among the plurality of first clock ranges, to determine a value for a second clock frequency obtained by multiplying the first reference frequency by a power of 2 as a second clock frequency, and to output a sensor clock signal having the second clock frequency, and a sensor circuit configured to select a second range from a plurality of second clock ranges based on the second clock frequency, to determine first compensation image data corresponding to the second range from among a plurality of compensation image data, and to generate final fingerprint image data as sensing data based on raw fingerprint image data and the first compensation image data.

BRIEF DESCRIPTION OF THE FIGURES

The above and other objects and features of the present disclosure will become apparent by describing in detail embodiments thereof with reference to the accompanying drawings.

FIGS. 3A and 3B are diagrams for describing a plurality of sensing data generated by a smart card chip of FIG. 2.

DETAILED DESCRIPTION

In biometric authentication systems, smart cards often communicate with card readers through direct contact. During this communication, the smart card receives an external clock signal from the card reader. However, when the frequency of this external clock signal shares an odd-numbered multiple relationship with the smart card's internal sensor clock frequency, utilized for biometric authentication, it can result in the generation of noise. This interference not only hampers the sensor's performance but also compromises the overall reliability of the smart card.

To address this challenge, the invention introduced herein proposes an unconventional approach. The advanced smart card design outlined in embodiments of the disclosure can selectively choose a sensor clock signal that has an even-numbered multiple relationship with the external clock signal. By aligning the frequencies in this manner, the smart card minimizes the disruptive noise produced during communication. As a result, the smart card operates with increased precision during biometric authentication processes, enhancing the card's reliability and ensuring more accurate results.

Below, embodiments of the present disclosure will be described in detail and clearly to such an extent that one skilled in the art easily carries out the present disclosure.

Figure 1:
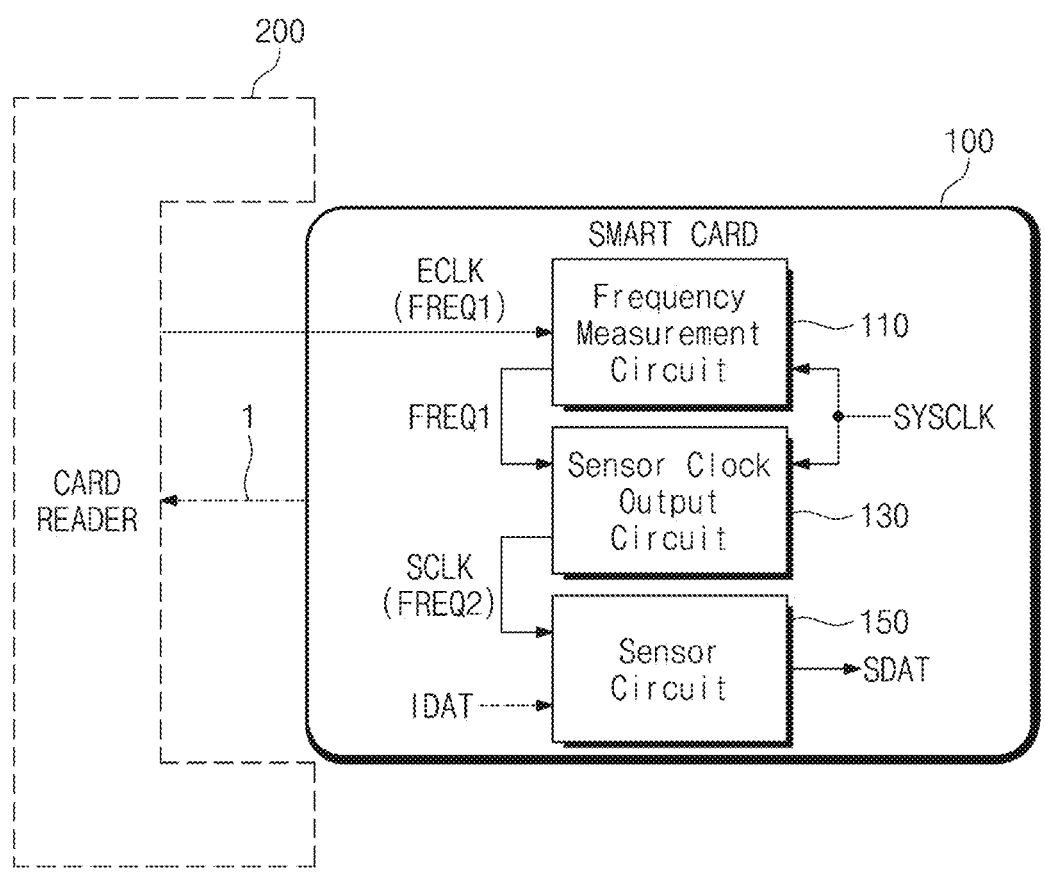
FIG. 1 is a block diagram illustrating a smart card according to an embodiment of the present disclosure.

FIG. 1 is a block diagram illustrating a smart card according to an embodiment of the present disclosure.

Referring to FIG. 1, a smart card 100 may perform biometric authentication using the user's fingerprint, face, iris, and vein and may have contact communication with a card reader 200. For example, the smart card 100 may communicate with the card reader 200 in the contact manner in compliance with the ISO/IEC 7816 standard and may communicate with the card reader 200 in the contactless manner in compliance with the ISO/IEC 14443 standard.

When the smart card 100 communicates with the card reader 200 in the contact manner, after physically coupled to the card reader 200, e.g., 1, the smart card 100 may receive an external clock signal ECLK with a first clock frequency FREQ1 from the card reader 200 and may communicate with the card reader 200 based on the external clock signal ECLK. The external clock signal ECLK may be a timing signal that comes from outside the electronic component or device, for example a smart card, and provides a consistent rhythm or reference for synchronizing operations. For example, the smart card may receive the external clock signal ECLK when the smart card communicates with an external device, such as a card reader. This external clock signal ECLK may be used to synchronize the operations between the card and the reader. Also, while the smart card 100 is being coupled to the card reader 200, the smart card 100 may internally generate a sensor clock signal SCLK with a second clock frequency FREQ2 and may perform a security process based on the sensor clock signal SCLK. The sensor clock signal SCLK may be a timing signal specifically associated with the operation of a sensor on the smart card. In some embodiments, the sensor clock signal SCLK is used for biometric authentication, such as a fingerprint or iris scanner. For example, the sensor clock signal SCLK may regulate and synchronize the operations and data reading tasks of the sensor. The sensor clock SCLK may determine how frequently the sensor reads or captures data and ensures that this data is processed at a consistent rate.

The smart card 100 may include a frequency measurement circuit 110, a sensor clock output circuit 130, and a sensor circuit 150.

The frequency measurement circuit 110 may measure the first clock frequency FREQ1 for the external clock signal ECLK. In an embodiment, the frequency measurement circuit 110 may receive the external clock signal ECLK from the card reader 200, may receive a system clock signal SYSCLK provided from the inside of the smart card 100, and may measure the first clock frequency FREQ1 based on the external clock signal ECLK and the system clock signal SYSCLK. In an embodiment, the frequency of the external clock signal ECLK may have an allowable frequency range from 1 MHz to 5 MHz, and the frequency measurement circuit 110 may measure the first clock frequency FREQ1 within the allowable frequency range of the external clock signal ECLK and may output the first clock frequency FREQ1 to the sensor clock output circuit 130. The frequency measurement circuit 110 will be described with reference to FIG. 5.

The sensor clock output circuit 130 may select a first range from a plurality of first clock ranges based on the first clock frequency FREQ1 and may generate the sensor clock signal SCLK having the second clock frequency FREQ2 corresponding to the first range.

In an embodiment, the sensor clock output circuit 130 may receive the first clock frequency FREQ1, may determine the first frequency range by selecting a clock range including the first clock frequency FREQ1 from among the plurality of first clock ranges, may determine a first reference frequency corresponding to the first frequency range, and may determine the second clock frequency FREQ2 by multiplying the reference frequency and on one of negative and positive powers of 2 together. For example, the sensor clock output circuit 130 may determine the plurality of first clock ranges based on an external clock range indicating the allowable frequency range for the external clock signal ECLK. In an embodiment, the sensor clock output circuit 130 may determine representative frequencies respectively included in and corresponding to the plurality of first clock ranges and may determine one representative frequency corresponding to the first range as the first reference frequency.

Figure 4:
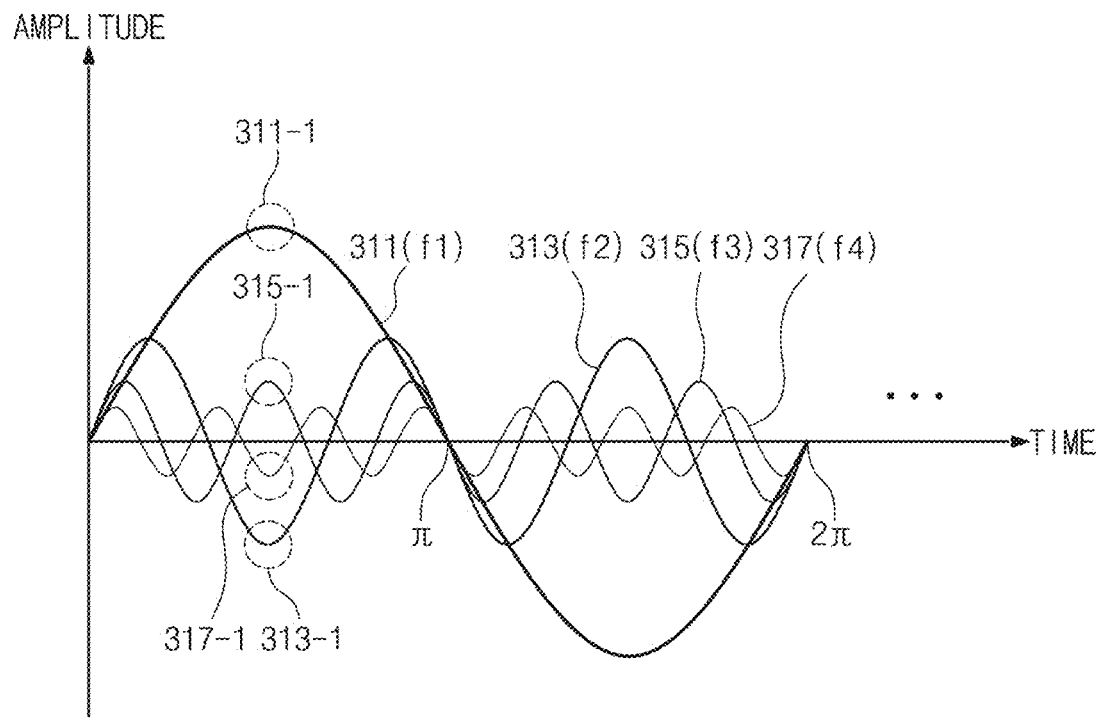
FIG. 4 is a graph for describing a relationship between an external clock signal input from the external of a smart card of FIG. 1 and a sensor clock signal generated within the smart card.

Referring to FIG. 4, when the external clock signal ECLK's frequency (FREQ1) and the sensor clock signal SCLK's frequency (FREQ2) share a specific multiple relationship, such as an odd-numbered multiple, a noise may be generated in the sensor clock signal SCLK due to the external clock signal ECLK. Accordingly, the sensor clock output circuit 130 may determine the second clock frequency FREQ2 such that the first clock frequency FREQ1 is an even-numbered multiple of the second clock frequency FREQ2 or the second clock frequency FREQ2 is an even-numbered multiple of the first clock frequency FREQ1 (hereinafter referred to as an even-numbered multiple relationship). How the second clock frequency FREQ2 is determined will be described with reference to FIGS. 8, 9, 10A, 10B, 11A, and 11B.

In an embodiment, the sensor clock output circuit 130 may determine candidate sensor clock frequencies respectively corresponding to the plurality of first clock ranges to be identical to the manner of determining the second clock frequency FREQ2. The sensor clock output circuit 130 may generate a sensor clock table including first correspondence relationships between the plurality of first clock ranges and the candidate sensor clock frequencies. After the sensor clock table is generated, the sensor clock output circuit 130 may select the second clock frequency FREQ2 based on the sensor clock table. The sensor clock table will be described with reference to FIGS. 6 and 7.

In an embodiment, the sensor clock output circuit 130 may further receive the system clock signal SYSCLK and may generate the sensor clock signal SCLK with the second clock frequency FREQ2 by dividing or multiplying the system clock signal SYSCLK.

The sensor circuit 150 may output sensing data SDAT for biometric authentication based on the sensor clock signal SCLK and first compensation image data.

In an embodiment, the sensor circuit 150 may store a plurality of compensation image data, may select a second range from a plurality of second clock ranges based on the sensor clock signal SCLK, may determine the first compensation image data by determining image data corresponding to the second range from among the plurality of compensation image data and may generate the sensing data SDAT based on the first compensation image data.

In an embodiment, the sensor circuit 150 may include a compensation image table including second correspondence relationships between the plurality of second clock ranges and the plurality of compensation image data. The plurality of second clock ranges may be determined based on a sensor clock range indicating the allowable frequency range for the sensor clock signal SCLK, and the sensor circuit 150 may select a clock range including the sensor clock signal SCLK from among the plurality of second clock ranges as the second range based on the compensation image table, may determine the first compensation image data corresponding to the second range, and may generate the sensing data SDAT based on input data IDAT and the first compensation image data.

For example, the sensor circuit 150 may generate the sensing data SDAT by subtracting the first compensation image data from the input data IDAT in units of corresponding pixel. For example, the subtracting may involve performing surface subtraction on the first compensation image data from the input data IDAT in units of corresponding pixel. Subtraction methods in image processing are used to differentiate two images to identify changes or differences between them. For example, by subtracting a compensation or reference image, the system can better highlight the unique ridges and valleys of the fingerprint while minimizing artifacts or background noise. For example, the input data IDAT may include biometric information obtained from the user of the smart card 100; in particular, the input data IDAT may include information about fingerprints of the user. In this case, the input data IDAT may be raw fingerprint image data associated with the user, and the sensing data SDAT may be final fingerprint image data associated with the user. For example, the biometric information may further include a plurality of information associated with a face, an iris, and a vein obtained from the user. The sensor circuit 150 will be described with reference to FIG. 12.

With the configuration described above, a smart card according to embodiments of the present disclosure may have contact communication with a card reader, may receive an external clock signal from the card reader, and may measure a clock frequency of the external clock signal. When a clock frequency of a sensor clock signal has an odd-numbered multiple relationship with the clock frequency of the external clock signal, a noise may be generated in the sensor clock signal due to the external clock signal. For this reason, the smart card may select the sensor clock signal such that the clock frequency of the sensor clock signal has the even-numbered multiple relationship with the clock frequency of the external clock signal and may output sensing data for biometric authentication based on the sensor clock signal. The sensor clock signal may be obtained by dividing or multiplying a system clock signal, and a compensation image corresponding to the clock frequency of the sensor clock signal may be selected in the process of generating sensing data. Accordingly, the smart card according to embodiments of the present disclosure may use the sensor clock signal capable of minimizing the noise caused by the external clock signal and may perform the sensing operation for biometric authentication by using the compensation image corresponding to the sensor clock signal, and thus, the reliability of the smart card may be increased.

Figure 2:
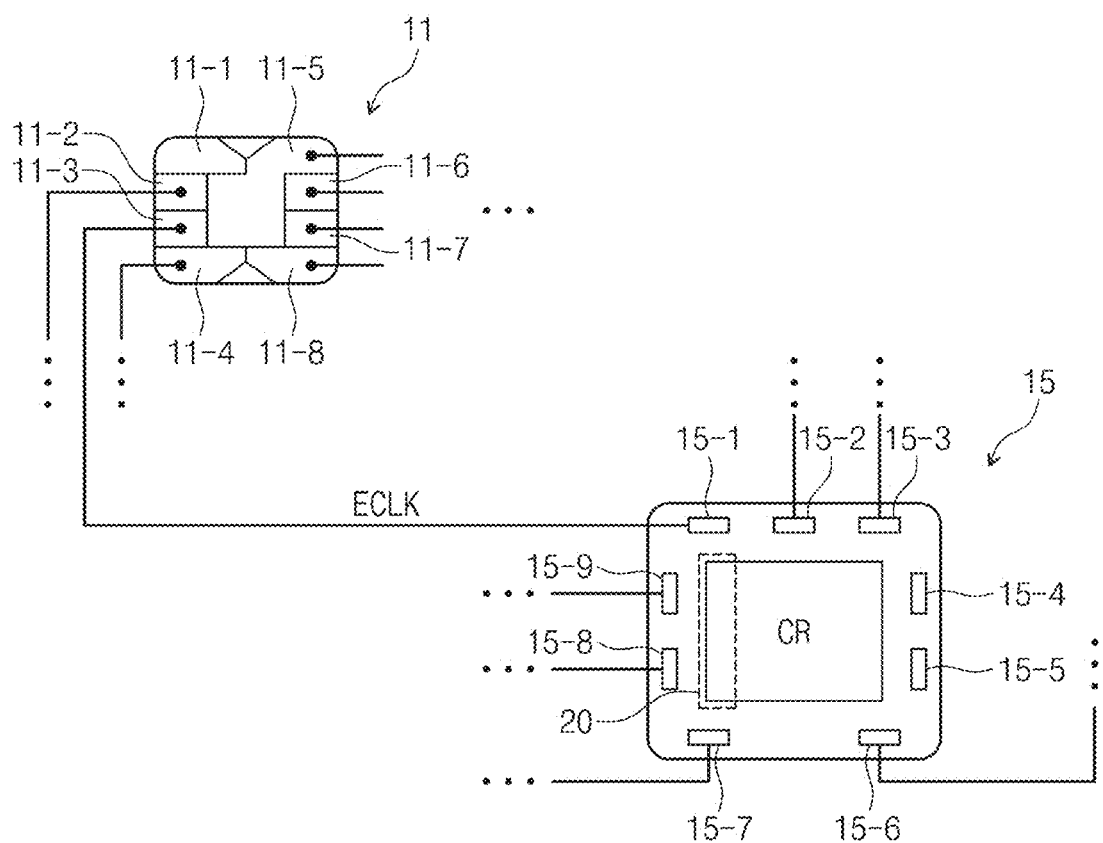
FIG. 2 is a diagram illustrating contact terminals and a smart card chip included in a smart card of FIG. 1.

FIG. 2 is a diagram illustrating contact terminals and a smart card chip included in a smart card of FIG. 1.

Contact terminals 11 and a smart card chip 15 are illustrated in FIG. 2.

Referring to FIGS. 1 and 2, the contact terminals 11 and the smart card chip 15 may be disposed in the smart card 100 of FIG. 1. In an embodiment, the contact terminals 11 and the smart card chip 15 may be respectively disposed in independent regions of one surface of the smart card 100. For example, when the smart card 100 is physically coupled to the card reader 200, the card reader 200 may provide signals, power supply voltages to the smart card chip 15 through the contact terminals 11. However, embodiments of the present disclosure are not limited thereto, and the card reader 200 may provide a plurality of data to the smart card chip 15 though the contact terminals 11.

In an embodiment, the contact terminals 11 may include a plurality of terminals 11-1, 11-2, 11-3, 11-4, 11-5, 11-6, 11-7, and 11-8, and the smart card chip 15 may include a plurality of pads 15-1, 15-2, 15-3, 15-4, 15-5, 15-6, 15-7, 15-8, and 15-9. For example, the smart card 100 can receive various inputs through the terminals 11-1 to 11-8. These inputs include power supply voltages such as operating and ground voltages. Signals like reset and clock signals are also transmitted to the card. Additionally, input and output data, including serial data, may be sent through these terminals. In some examples, the received inputs are then relayed to the pads 15-1 to 15-9.

In an embodiment, the external clock signal ECLK may be transmitted through one (e.g., 11-3) among the plurality of terminals 11-1 to 11-8 and may be transferred to one (e.g., 15-1) among the plurality of pads 15-1 to 15-9. Various processors and logic circuits for obtaining and processing biometric information including the user's fingerprint may be disposed in a center region CR of the smart card chip 15. A receiver stage that transfers signals and data from the pads 15-1 to 15-9 to these processors and circuits may be formed on one side (e.g., 20) of the center region CR. In this case, due to a location of a pad receiving the external clock signal ECLK and a location of the receiver stage, the external clock signal ECLK may have a bad influence on the sensor clock signal SCLK, that is, the noise may be generated in the sensor clock signal SCLK.

FIGS. 3A and 3B are diagrams for describing a plurality of sensing data generated by a smart card chip of FIG. 2.

A plurality of sensing data 31, 33, 35, and 37 are illustrated in FIGS. 3A and 3B. The input data IDAT of FIG. 1 may be input through the center region CR of the smart card 100 of FIG. 2, and the plurality of sensing data 31, 33, 35, and 37 may be generated by subtracting specific compensation image data from the input data IDAT. For example, the sensing data 31 and 33 represent ideal images, unaffected by any external clock signal (like ECLK from FIG. 1). On the other hand, sensing data 35 and 37 show images from real scenarios where the sensor clock signal (like SCLK from FIG. 1) is influenced by the external clock signal.

Referring to FIG. 3A, in the ideal case, the sensing data 31 may be obtained before a specific pattern as the input data IDAT is not input, and the sensing data 33 may be obtained after the specific pattern is input.

Referring to FIG. 3B, in real scenarios, the sensing data 35 may be obtained before the specific pattern as the input data IDAT is not input, and the sensing data 37 may be obtained after the specific pattern is input.

Referring to FIGS. 3A and 3B, compared to the sensing data 31 and 33, the sensing data 35 and 37 may include noises coming from the external clock signal in a region corresponding to the location of the receiver stage described with reference to FIG. 2.

FIG. 4 is a graph for describing a relationship between an external clock signal input from the external of a smart card of FIG. 1 and a sensor clock signal generated within the smart card.

A plurality of waveforms 311, 313, 315, and 317 having different frequencies (or periods) are illustrated in FIG. 4. Each of the plurality of waveforms 311, 313, 315, and 317 may indicate a period signal from 0 to 2π, and frequencies that the plurality of waveforms 311, 313, 315, and 317 have may have a specific multiple relationship, such as an odd-numbered multiple.

For example, the frequency of the waveform 311 may be f1, the frequency of the waveform 313 may be f2, the frequency of the waveform 315 may be f3, and the frequency of the waveform 317 may be f4. For example, f2, f3, and f4 may be obtained by multiplying f1 by 3, 5, and 7, respectively; the frequencies f1, f2, f3, and f4 of the waveforms 311, 313, 315, and 317 may be defined as having an odd-numbered multiple relationship. In this case, the pattern of the waveform 311 from 0 to π may have the same shape as the pattern of the waveform 311 from π to 2π but may be opposite in sign to the pattern of the waveform 311 from π to 2π. The waves 313, 315, and 317 may also have the same characteristics as the waveform 311. That is, the waveforms 311, 313, 315, and 317 whose frequencies have the odd-numbered multiple relationship may change to similar shapes in any time interval, and one waveform may easily affect another waveform in such a way that a change in the one waveform is reflected to another waveform.

For example, when the second clock frequency FREQ2 of the sensor clock signal SCLK of FIG. 1 has the odd-numbered multiple relationship with the first clock frequency FREQ1 of the external clock signal ECLK, the sensor clock signal SCLK may be easily affected by the external clock signal ECLK. For example, the external clock signal ECLK may generate the noise in the sensor clock signal SCLK. Accordingly, in the case of using the sensor clock signal SCLK whose clock frequency has the even-numbered multiple relationship with the first clock frequency FREQ1 of the external clock signal ECLK, the noise capable of being generated by the external clock signal ECLK may be minimized.

Figure 5:
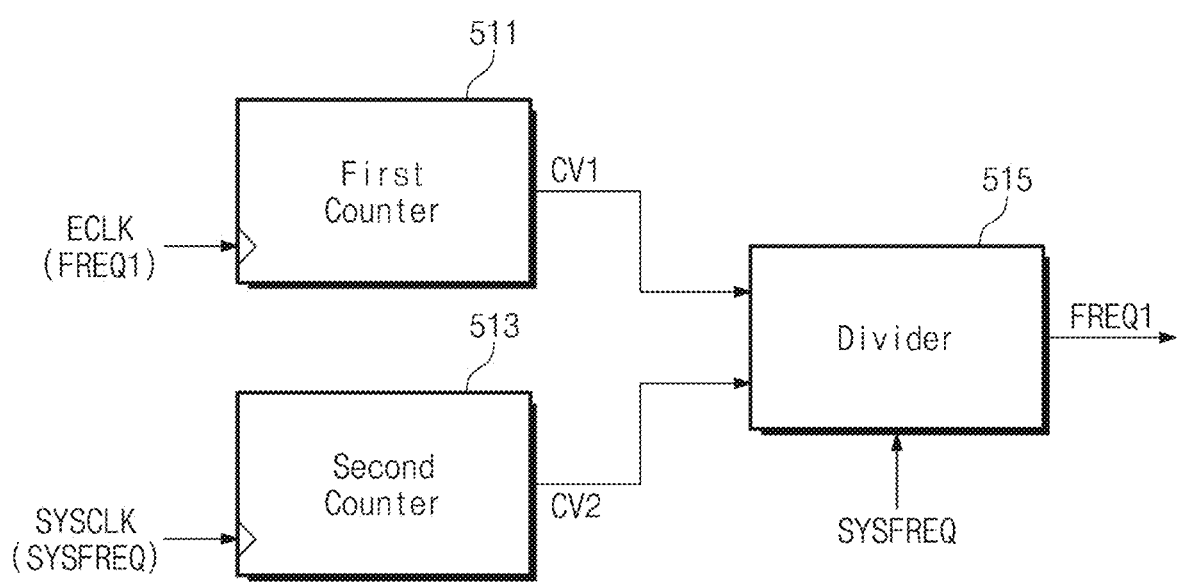
FIG. 5 is a block diagram illustrating an embodiment of a frequency measurement circuit of FIG. 1.

FIG. 5 is a block diagram illustrating an embodiment of a frequency measurement circuit of FIG. 1.

Referring to FIG. 5, a frequency measurement circuit 510 may include a first counter 511, a second counter 513, and a divider 515. The frequency measurement circuit 510 may correspond to the frequency measurement circuit 110 of FIG. 1.

The first counter 511 may receive the external clock signal ECLK and may determine and output a first count value CV1 based on the external clock signal ECLK.

The second counter 513 may receive the system clock signal SYSCLK and may determine and output a second count value CV2 based on the system clock signal SYSCLK.

In an embodiment, the first counter 511 counts how often the external clock signal ECLK toggles within a specific time interval, then outputs this as the first count value CV1.

Similarly, the second counter 513 tracks the toggling frequency of the system clock signal SYSCLK within the same interval, producing the second count value CV2.

The divider 515 may receive the first count value CV1 from the first counter 511, may receive the second count value CV2 from the second counter 513, and may determine and output the first clock frequency FREQ1 based on the first count value CV1 and the second count value CV2.

In an embodiment, the divider 515 may determine and output the first clock frequency FREQ1 by multiplying a clock frequency SYSFREQ of the system clock signal SYSCLK and a result of dividing the first count value CV1 by the second count value CV2. In this case, the clock frequency SYSFREQ of the system clock signal SYSCLK may be identified in advance, and a clock frequency of the external clock signal ECLK may be measured as the first clock frequency FREQ1 based on the clock frequency SYSFREQ of the system clock signal SYSCLK.

Figure 6:
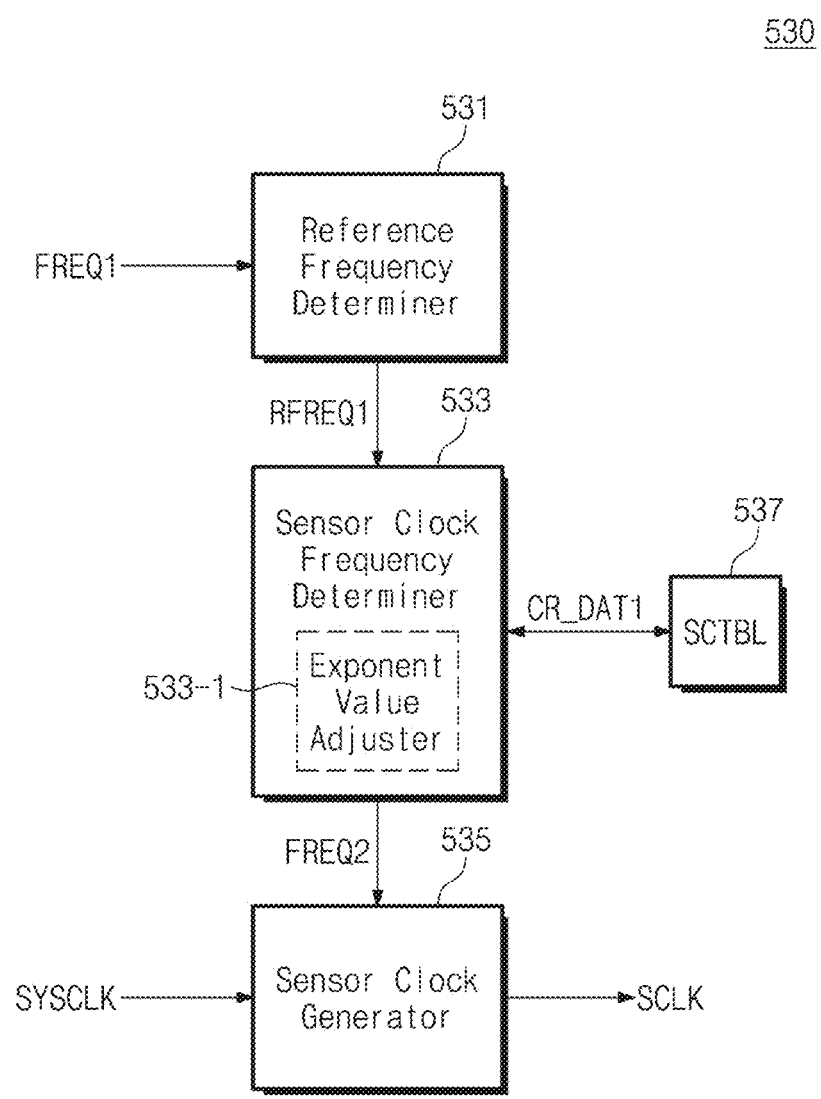
FIG. 6 is a block diagram illustrating an embodiment of a sensor clock output circuit of FIG. 1.

FIG. 6 is a block diagram illustrating an embodiment of a sensor clock output circuit of FIG. 1.

Referring to FIGS. 1 and 6, a sensor clock output circuit 530 may include a reference frequency determiner 531, a sensor clock frequency determiner 533, and a sensor clock generator 535. The sensor clock output circuit 530 may further include a sensor clock table 537. The sensor clock frequency determiner 533 may include an exponent value adjuster 533-1. The sensor clock output circuit 530 may correspond to the sensor clock output circuit 130.

The reference frequency determiner 531 may receive the first clock frequency FREQ1 from the frequency measurement circuit 110. The reference frequency determiner 531 may determine a first reference frequency RFREQ1 based on the first clock frequency FREQ1. In an embodiment, the reference frequency determiner 531 may select a clock range including the first clock frequency FREQ1 from a plurality of first clock ranges as a first range and may determine the first reference frequency RFREQ1 based on the first range. The plurality of first clock ranges may be determined based on an external clock range indicating an allowable frequency range for the external clock signal ECLK, and the external clock range may be set in advance.

The sensor clock frequency determiner 533 may receive the first reference frequency RFREQ1 from the reference frequency determiner 531. The sensor clock frequency determiner 533 may determine the second clock frequency FREQ2 by multiplying the first reference frequency RFREQ1 by one of positive and negative powers of 2.

In an embodiment, the sensor clock frequency determiner 533 may determine a power of 2 to be multiplied by the first reference frequency RFREQ1 based on a sensor clock range and may determine the second clock frequency FREQ2 by multiplying the first reference frequency RFREQ1 by the determined power of 2. For example, the sensor clock range may be determined based on a sensor clock range indicating an allowable frequency range for the sensor clock signal SCLK, and the sensor clock range may be set in advance. For example, the sensor clock frequency determiner 533 may compare the sensor clock range with a value obtained by multiplying the first reference frequency RFREQ1 by the power of 2 and may determine the second clock frequency FREQ2. How the second clock frequency FREQ2 is determined will be described with reference to FIGS. 8, 9, 10A, 10B, 11A, and 11B.

In an embodiment, the sensor clock frequency determiner 533 may use the exponent value adjuster 533-1 to adjust the exponent of the power of 2 that multiplies the first reference frequency RFREQ1. For example, when the value obtained by multiplying the first reference frequency RFREQ1 by the power of 2 is out of the sensor clock range, the sensor clock frequency determiner 533 may adjust the exponent value accordingly.

In an embodiment, the sensor clock frequency determiner 533 may receive the plurality of first clock ranges from the reference frequency determiner 531, may generate candidate sensor clock frequencies based on a result of determining the second clock frequency FREQ2, may generate first correspondence relationship data CR_DAT1 indicating first correspondence relationships between the plurality of first clock ranges and the candidate sensor clock frequencies, and may write or read the first correspondence relationship data CR_DAT1 in or from the sensor clock table 537.

The sensor clock generator 535 may receive the second clock frequency FREQ2 from the sensor clock frequency determiner 533, may receive the system clock signal SYSCLK from the external, and may generate the sensor clock signal SCLK based on the second clock frequency FREQ2 and the system clock signal SYSCLK. In an embodiment, the sensor clock generator 535 may generate the sensor clock signal SCLK with the second clock frequency FREQ2 by dividing or multiplying the system clock signal SYSCLK. In an embodiment, various parameters of hardware components in a smart card may be set based on the sensor clock signal SCLK.

Figure 7:
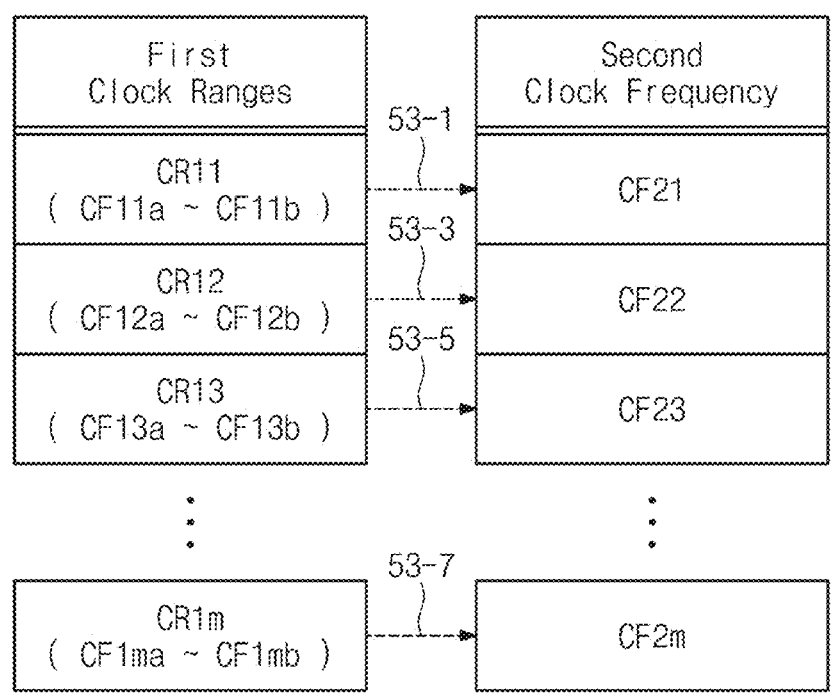
FIG. 7 is a diagram for describing a sensor clock table that a sensor clock output circuit of FIG. 6 includes.

FIG. 7 is a diagram for describing a sensor clock table that a sensor clock output circuit of FIG. 6 includes.

Referring to FIGS. 6 and 7, the sensor clock table 537 may include first correspondence relationships 53-1, 53-3, 53-5, and 53-7 between a plurality of first clock ranges CR11, CR12, CR13, . . . , CR1m (m being an integer of 4 or more) and candidate sensor clock frequencies CF21, CF22, CF23, . . . , CF2m.

In an embodiment, the plurality of first clock ranges CR11 to CR1m may be determined based on an external clock range indicating an allowable frequency range for an external clock signal. For example, the frequency of the external clock signal may have the allowable frequency range from CF11a to CF1mb, and the plurality of first clock ranges CR11 to CR1m may be determined by dividing the allowable frequency range from CF11a to CF1mb evenly. For example, the first clock range CR11 may include CF11a to CF11b, the first clock range CR12 may include CF12a to CF12b, the first clock range CR13 may include CF13a to CF13b, and the first clock range CR1m may include CF1ma to CF1mb. However, the present disclosure is not limited thereto.

In an embodiment, the candidate sensor clock frequencies CF21 to CF2m may be determined based on a sensor clock range indicating an allowable frequency range for a sensor clock signal. For example, the frequency of the sensor clock signal may have the allowable frequency range from CF21 to CF2m. Referring to FIG. 1 and FIG. 6, when the range is not out of the sensor clock range, the second clock frequency FREQ2 within a range may be determined. For example, the candidate sensor clock frequencies CF21 to CF2m may be determined by multiplying the power of 2 by the first reference frequency FREQ1 and representative frequencies respectively included in and corresponding to the plurality of first clock ranges CR11 to CR1m together.

In an embodiment, each of the representative frequencies may be determined as one of an upper limit of the corresponding clock range, a lower limit of the corresponding clock range, and a median value of the upper limit and the lower limit, but the present disclosure is not limited thereto.

In an embodiment, the external clock range may be from 1 MHz to 5 MHz, and the sensor clock range may be from 1 MHz to 2.5 MHz. however, the present disclosure is not limited thereto.

In an embodiment, the first clock range CR11 may correspond to the candidate sensor clock frequency CF21, the first clock range CR12 may correspond to the candidate sensor clock frequency CF22, the first clock range CR13 may correspond to the candidate sensor clock frequency CF23, and the first clock range CR1m may correspond to the candidate sensor clock frequency CF2m.

FIGS. 8, 9, 10A, 10B, 11A, and 11B are diagrams for describing operations of determining a second clock frequency for a sensor clock signal.

According to some embodiments, the plurality of first clock ranges CR11, CR12, CR13, . . . , CR1m, representative frequencies CF11r, CF12r, CF13r, . . . , CF1mr, and the candidate sensor clock frequencies CF21, CF22, CF23, . . . , CF2m are as illustrated in FIGS. 8, 9, 10A, 10B, 11A, and 11B. The plurality of first clock ranges CR11 to CR1m, the representative frequencies CF11r to CF1mr, and the candidate sensor clock frequencies CF21 to CF2m are similar to the embodiments illustrated in FIGS. 1, 6, and 7.

Figure 8:
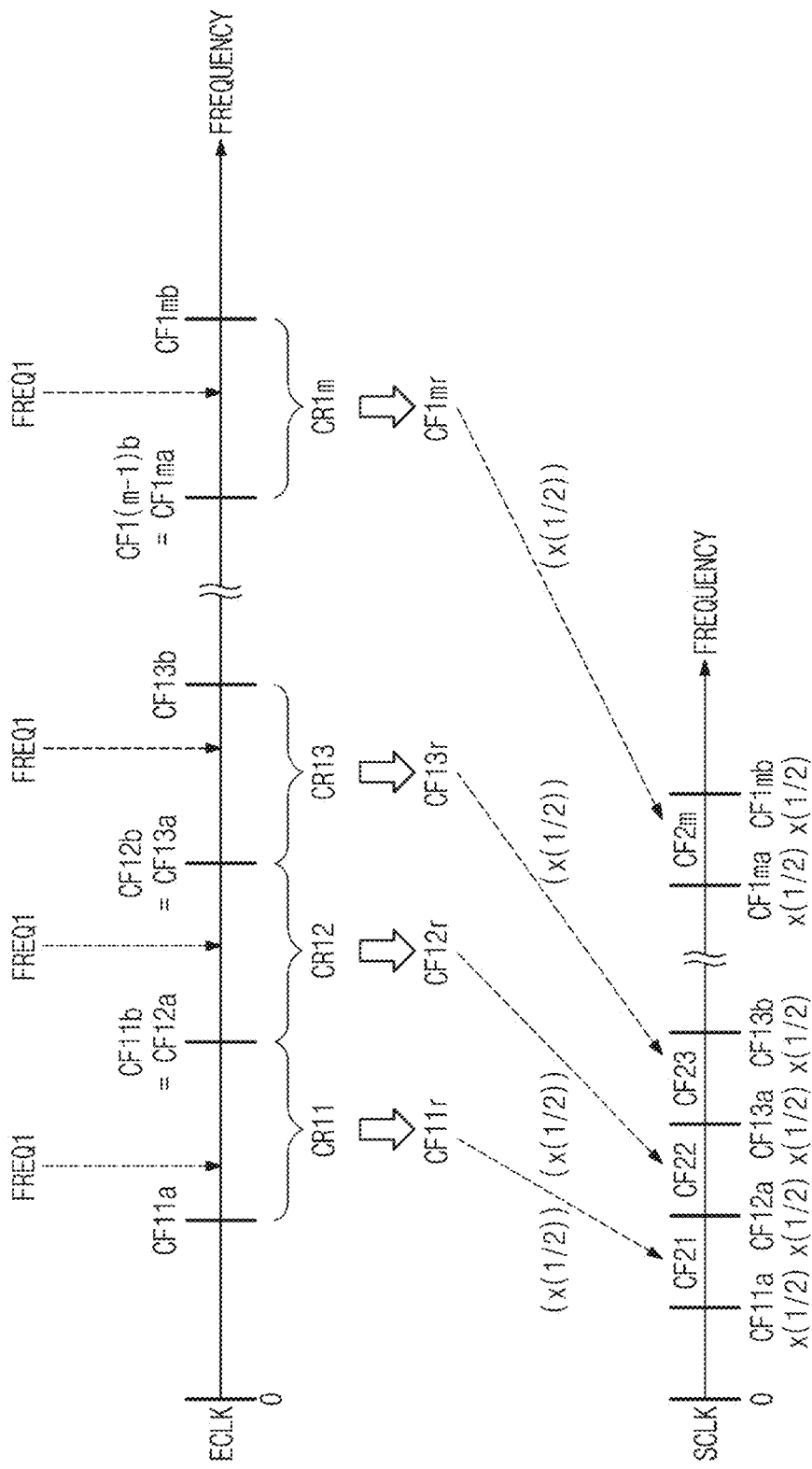
FIGS. 8, 9, 10A, 10B, 11A, and 11B are diagrams for describing operations of determining a second clock frequency that a sensor clock signal has.
Figure 9:
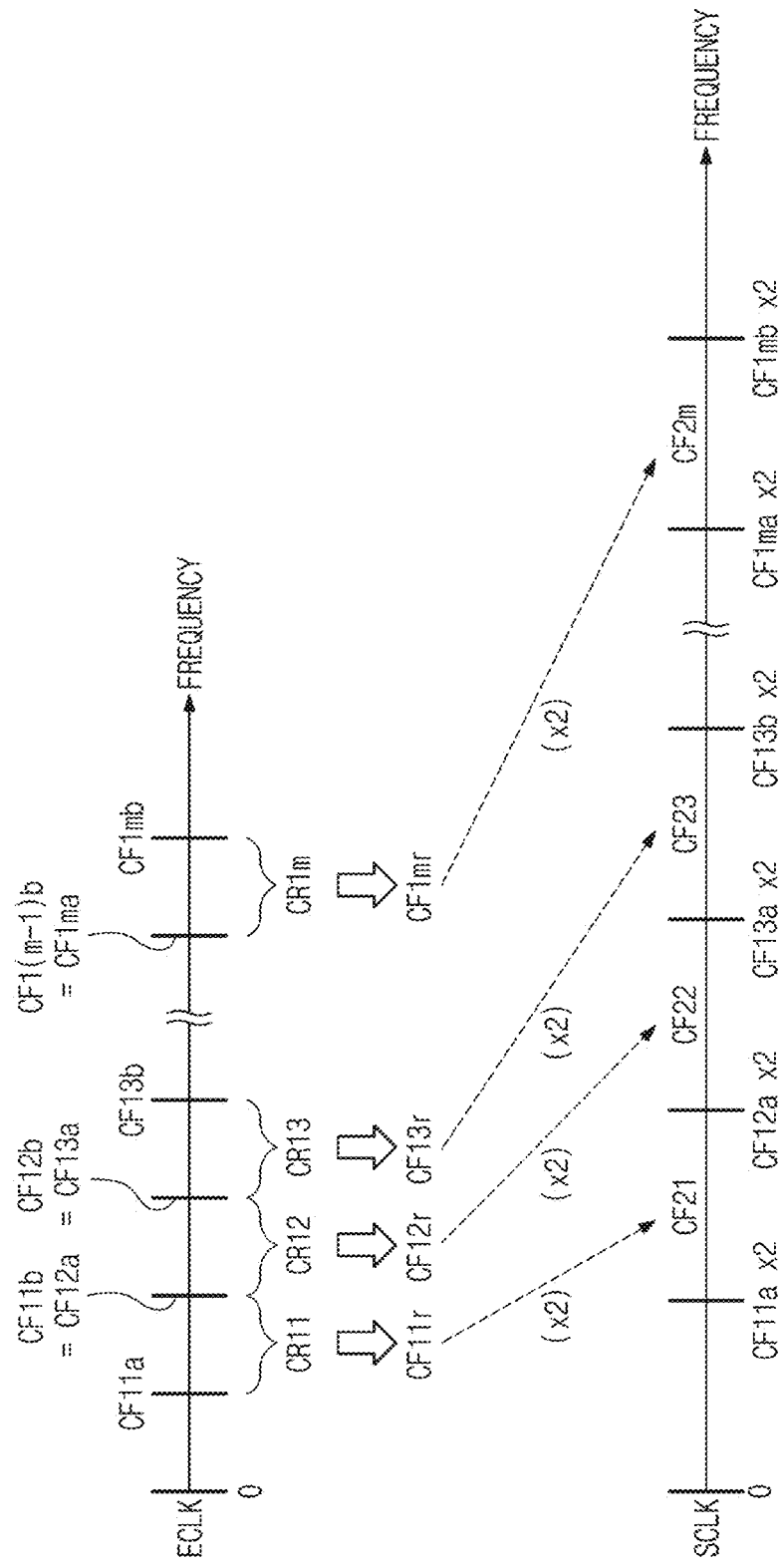

In FIGS. 8 and 9, the candidate sensor clock frequencies CF21 to CF2m may not be out of the sensor clock range of FIG. 7. In FIGS. 10A, 10B, 11A, and 11B, some or all of the candidate sensor clock frequencies CF21 to CF2m may be out of the sensor clock range. For example, as described with reference to FIG. 6, the exponent value of the power of 2 to be multiplied by the first reference frequency RFREQ1 may be adjusted.

Referring to FIG. 8, when the first clock frequency FREQ1 of the external clock signal ECLK is included in one of the plurality of first clock ranges CR11 to CR1m, a clock range including the first clock frequency FREQ1 may be selected as a first range, and a representative frequency corresponding to the first range may be a first reference frequency. In this case, the second clock frequency may be determined by multiplying the first reference frequency by 2 raised to the power of "−1". For example, when the first clock frequency FREQ1 is between CF11a and CF11b, the clock range CR11 may be selected as the first range, and CF21 obtained by multiplying the representative frequency CF11r corresponding to the first range by "2^(−1)" may be determined as the second clock frequency. Even in the case where the first clock frequency FREQ1 is included in one of the remaining clock ranges (e.g., CR12, CR13, . . . , CR1m), the second clock frequency may be determined to be similar to the case where the first clock frequency FREQ1 is included in the first clock range CR11. In some cases when only one of clock frequencies CF21 to CF2m is determined as the second clock frequency, all the clock frequencies CF21 to CF2m may be determined as candidate sensor clock frequencies and may be written in the sensor clock table 537 of FIGS. 6 and 7.

Referring to FIG. 9, as in the above description given with reference to FIG. 8, when the first clock frequency FREQ1 of the external clock signal ECLK is included in one of the plurality of first clock ranges CR11 to CR1m, the second clock frequency may be determined by multiplying the first reference frequency by 2 raised to the power of "+1". For example, when the first clock frequency FREQ1 is between CF11a and CF11b, the clock range CR11 may be selected as the first range, and CF21 obtained by multiplying the representative frequency CF11r corresponding to the first range by "2^(+1)" may be determined as the second clock frequency. Even in the case where the first clock frequency FREQ1 is included in one of the remaining clock ranges (e.g., CR12, CR13, . . . , CR1m), the second clock frequency may be determined to be similar to the case where the first clock frequency FREQ1 is included in the first clock range CR11.

Figure 10A:
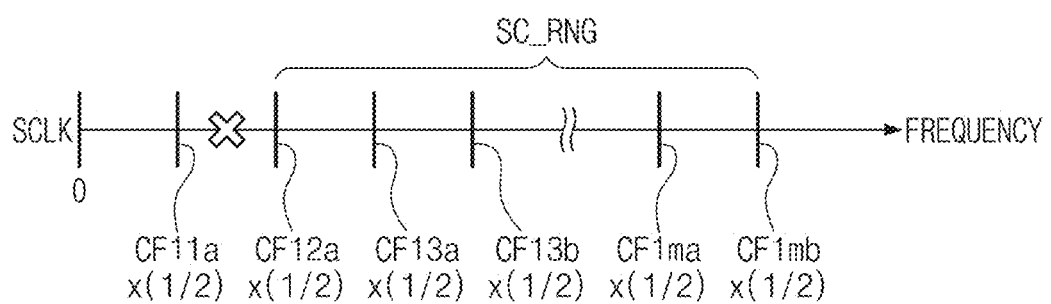

Referring to FIG. 10A, a sensor clock range SC_RNG may have an upper limit UL and a lower limit LL. For example, the sensor clock range SC_RNG from CF12a to CF1mb may be set in advance. The sensor clock range SC_RNG may indicate an allowable frequency range for the sensor clock signal SCLK. In this case, the sensor clock signal SCLK may be prohibited from having a second clock frequency corresponding to a range from CF11a to CF12a.

Figure 10B:
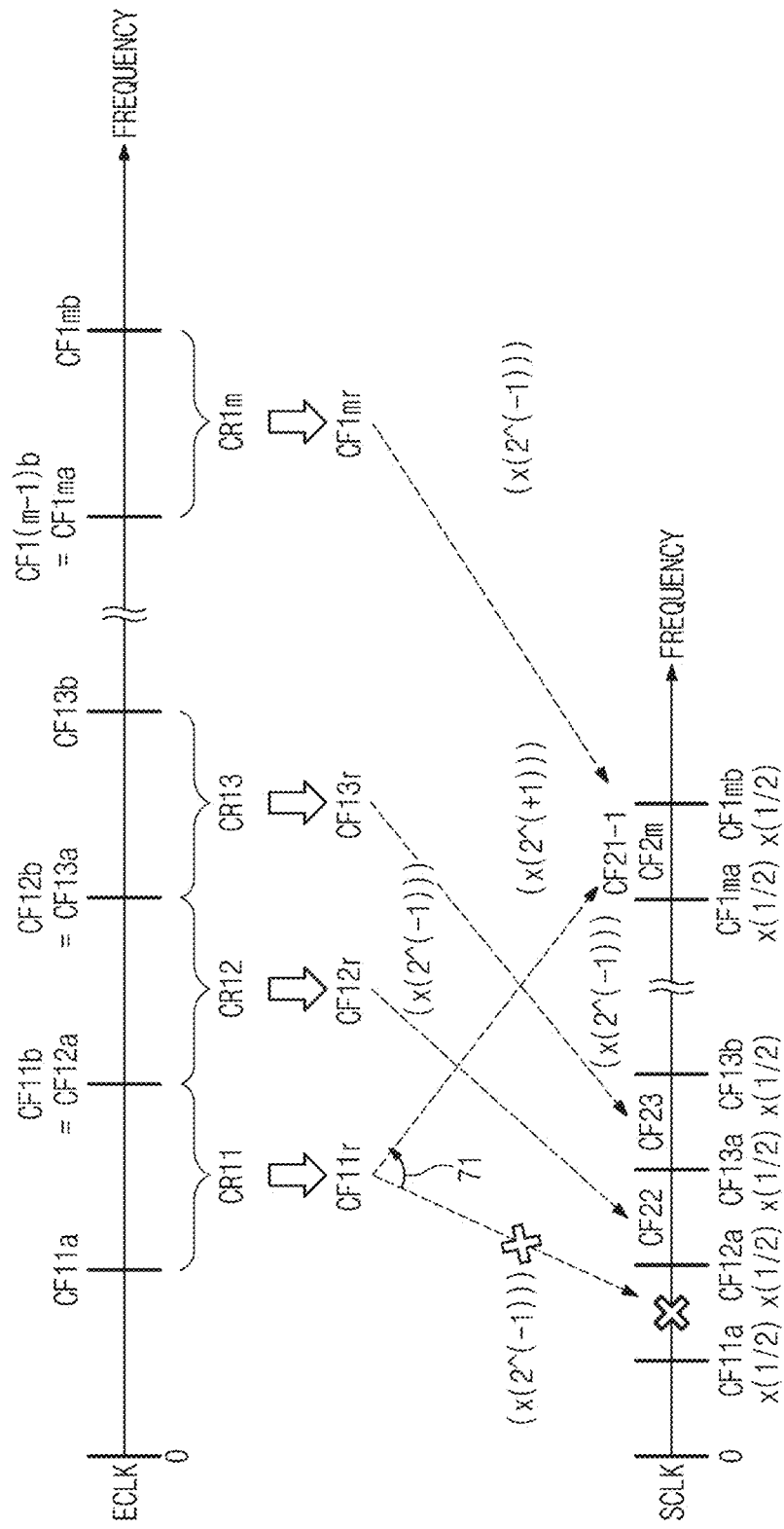

Referring to FIG. 10B, when a first value obtained by multiplying a first reference frequency (e.g., CF11r) by the negative power of 2 (e.g., $2^{(-1)}$) is smaller than the lower limit LL of the sensor clock range SC_RNG, the second clock frequency CF21-1 may be determined by multiplying the first reference frequency by the positive power of 2 (e.g., 2 (+1)), instead of t by multiplying the first reference frequency by the negative power of 2 (e.g., $2^{(-1)}$).

As in the above description, when a second value obtained by multiplying the first reference frequency by the positive power of 2 is greater than the upper limit UL of the sensor clock range SC_RNG, instead of the value obtained by multiplying the first reference frequency by the positive power of 2, a value obtained by multiplying the first reference frequency by the negative power of 2 may be determined as the second clock frequency.

In an embodiment, when the first value is greater than the lower limit LL of the sensor clock range SC_RNG and when the first value is smaller than the upper limit UL of the sensor clock range SC_RNG, the second clock frequency may be determined by multiplying the first reference frequency by the negative power of 2. For example, when both the first value and the second value are included in the sensor clock range SC_RNG, to reduce the power consumption of the smart card, the value obtained by multiplying the first reference frequency by the negative power of 2 may be determined as the second clock frequency.

Figure 11A:
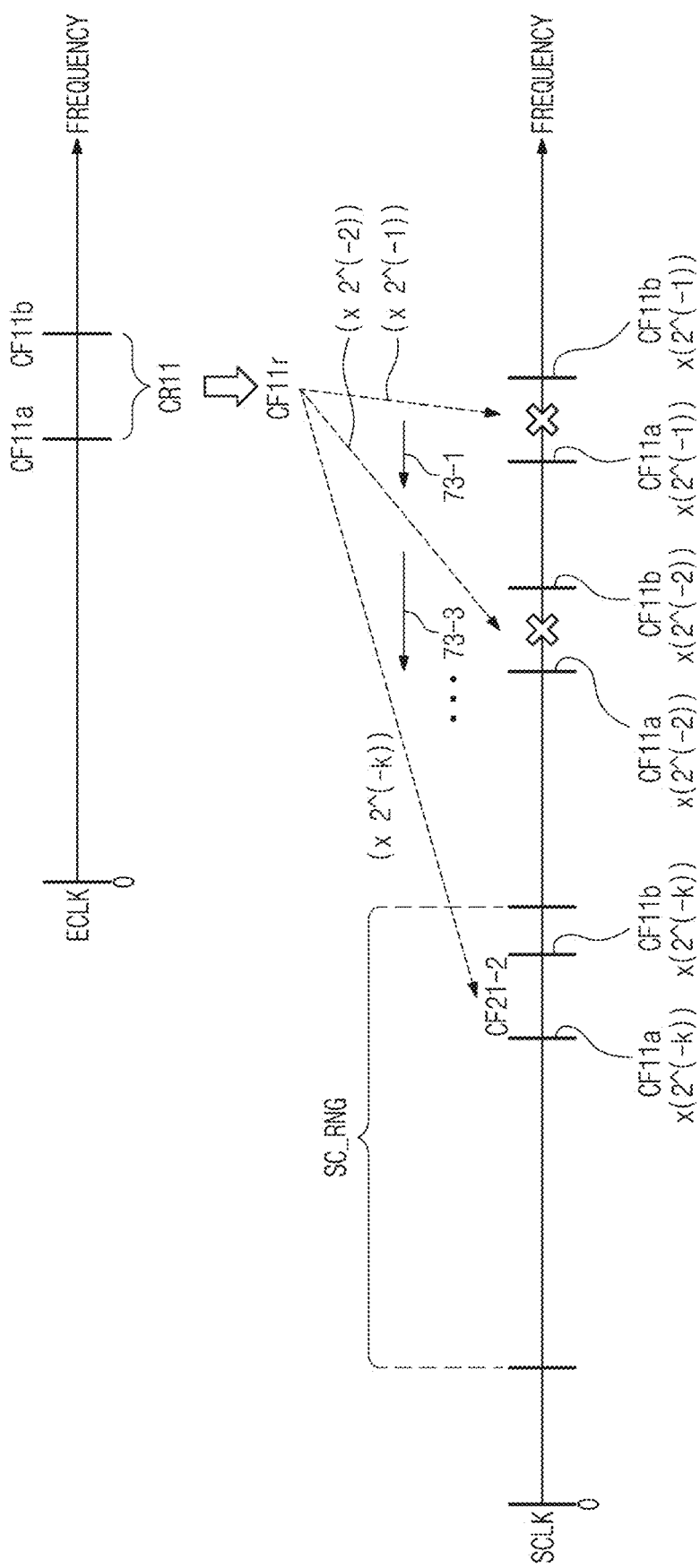

Referring to FIG. 11A, when a first value obtained by multiplying a first reference frequency (e.g., CF11r) by the negative power of 2 (e.g., $2^{(-1)}$) is greater than the upper limit UL of the sensor clock range SC_RNG, the exponent value of the negative power of 2 may be decreased (e.g., 73-1 or 73-3), and the second clock frequency such as a third value (e.g., CF21-2) may be determined by multiplying the first reference frequency (e.g., CF11r) by the power of 2 of the decreased exponent value (e.g., "−k") (k being an integer more than 1). In an embodiment, when the first value is greater than the upper limit UL of the sensor clock range SC_RNG, the sensor clock output circuit 530 may decrease the exponent value of the negative power of 2 until the value obtained by multiplying the first reference frequency by the negative power of 2 is smaller than the upper limit UL of the sensor clock range SC_RNG (e.g., until the value is a value of "−k").

Figure 11B:
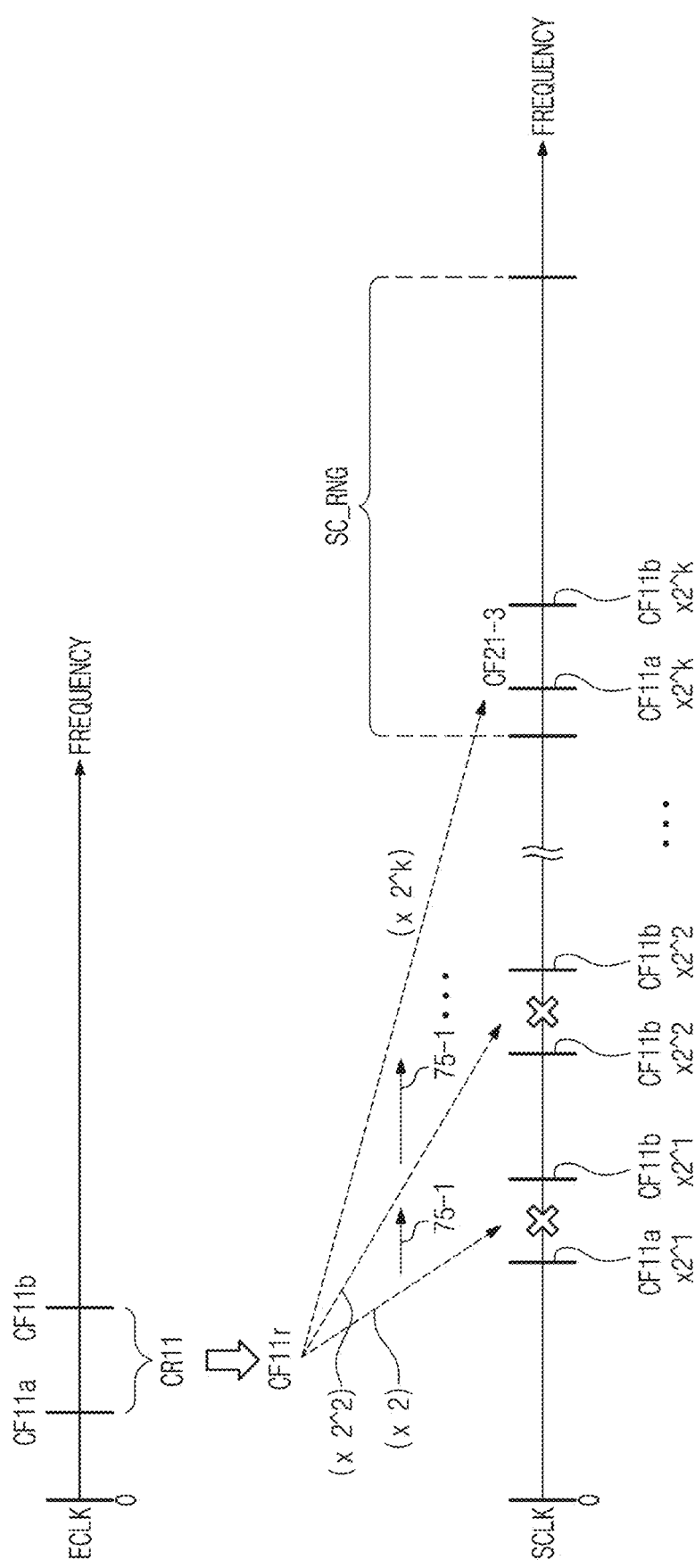

Referring to FIG. 11B, when a second value obtained by multiplying a first reference frequency (e.g., CF11r) by the positive power of 2 (e.g., $2^{(+1)}$) is smaller than the lower limit LL of the sensor clock range SC_RNG, the exponent value of the positive power of 2 may be increased (e.g., 75-1 or 75-3), and the second clock frequency such as a fourth value (e.g., CF21-3) may be determined by multiplying the first reference frequency (e.g., CF11r) by the power of 2 of the increased exponent value (e.g., "+k"). In an embodiment, when the second value is smaller than the lower limit LL of the sensor clock range SC_RNG, the sensor clock output circuit 530 may increase the exponent value of the positive power of 2 until the value obtained by multiplying the first reference frequency by the positive power of 2 is greater than the lower limit LL of the sensor clock range SC_RNG (e.g., until the value is a value of "+k").

Figure 12:
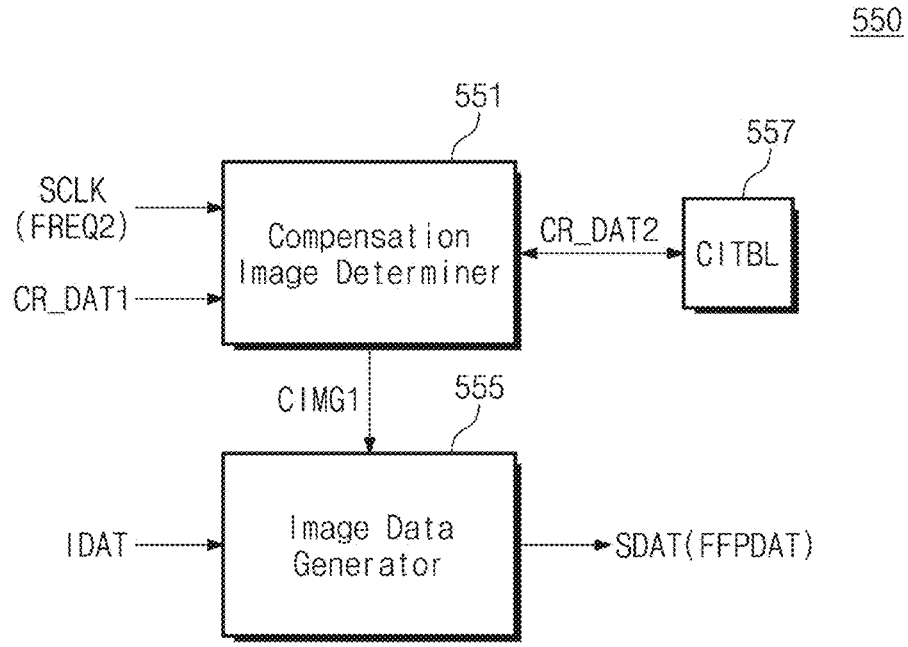
FIG. 12 is a block diagram illustrating an embodiment of a sensor circuit of FIG. 1.

FIG. 12 is a block diagram illustrating an embodiment of a sensor circuit of FIG. 1.

Referring to FIG. 12, a sensor circuit 550 may include a compensation image determiner 551 and an image data generator 555. A sensor circuit 550 and may further include a compensation image table (CITBL) 557. The sensor circuit 550 may correspond to the sensor circuit 150 of FIG. 1. The compensation image table 557 may include second correspondence relationships between a plurality of second clock ranges and a plurality of compensation image data.

The compensation image determiner 551 may store the plurality of compensation image data, may receive the sensor clock signal SCLK from a sensor clock output circuit (e.g., 130 of FIG. 1). The compensation image determiner 551 may further receive second correspondence relationship data CR_DAT2 indicating the second correspondence relationships from the compensation image table 557.

The compensation image determiner 551 may select a second range from the plurality of second clock ranges based on the second clock frequency FREQ2 for the sensor clock signal SCLK. The compensation image determiner 551 may determine first compensation image data CIMG1 corresponding to the second range from among the plurality of compensation image data. The compensation image determiner 551 may output the first compensation image data CIMG1 to the image data generator 555.

The image data generator 555 may generate the sensing data SDAT based on the input data IDAT and the first compensation image data CIMG1. For example, the input data IDAT may include biometric information obtained from the user of the smart card; in particular, the input data IDAT may include information about fingerprints of the user. In this case, the input data IDAT may be raw fingerprint image data associated with the user, and the sensing data SDAT may be final fingerprint image data FFPDAT associated with the user.

In an embodiment, the image data generator 555 may generate the final fingerprint image data FFPDAT by subtracting the first compensation image data CIMG1 from the raw fingerprint image data for each pixel value (i.e., by subtracting pixel values of the first compensation image data CIMG1 from pixel values of the raw fingerprint image data, respectively).

Figure 13:
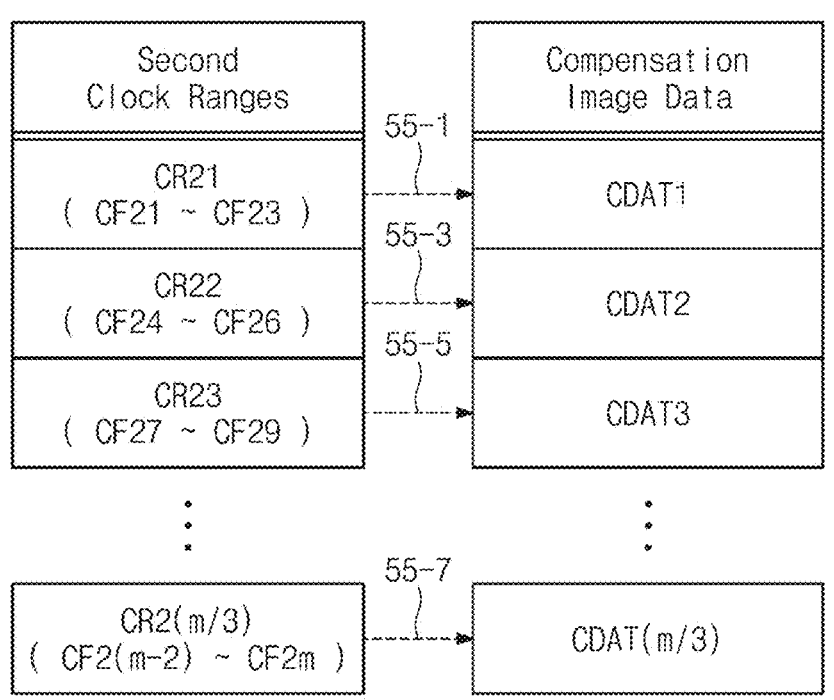
FIG. 13 is a diagram for describing a compensation image table that a sensor circuit of FIG. 12 includes.

FIG. 13 is a diagram for describing a compensation image table that a sensor circuit of FIG. 12 includes.

Referring to FIGS. 12 and 13, the compensation image table 557 may include second correspondence relationships 55-1, 55-3, 55-5, and 55-7 between a plurality of second clock ranges CR21, CR22, CR23, . . . , CR2(m/3) and a plurality of compensation image data CDAT1, CDAT2, CDAT3, . . . , CDAT(m/3).

In an embodiment, the plurality of second clock ranges CR21 to CR2(m/3) may be determined based on the candidate sensor clock frequencies CF21, CF22, CF23, . . . , CF2m. For example, the clock range CR21 may include CF21 to CF23, the clock range CR22 may include CF24 to CF26, the clock range CR23 may include CF27 to CF29, and the clock range CR2(m/3) may include CF2(m−2) to CF2m. However, the present disclosure is not limited thereto.

In an embodiment, the plurality of compensation image data CDAT1 to CDAT(m/3) may be determined based on the plurality of second clock ranges CR21 to CR2(m/3). For example, the plurality of compensation image data CDAT1 to CDAT(m/3) may be determined to respectively correspond to the plurality of second clock ranges CR21 to CR2(m/3). However, embodiments of the present disclosure are not limited thereto.

Figure 14:
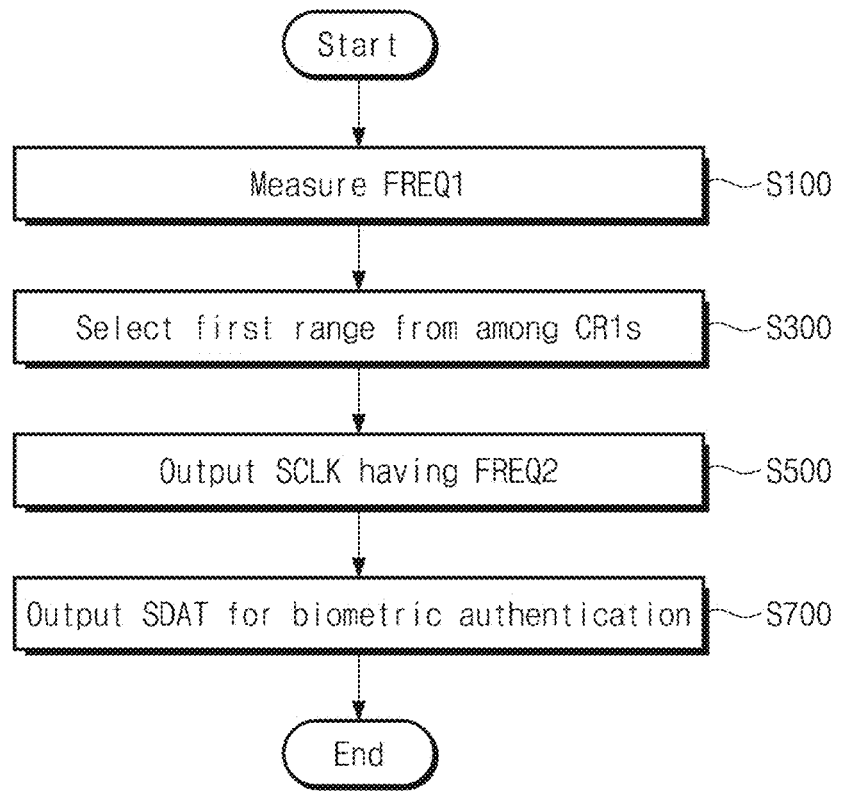
FIG. 14 is a flowchart illustrating a method of operating a smart card, according to an embodiment of the present disclosure.

FIG. 14 is a flowchart illustrating a method of operating a smart card, according to an embodiment of the present disclosure.

Referring to FIG. 14, in a method of operating a smart card, the first clock frequency FREQ1 that an external clock signal has may be measured (S100).

In an embodiment, operation S100 may be performed by the frequency measurement circuit 110 or 510 of FIG. 1 or 5.

In an embodiment, when the smart card communicates with an external card reader in a contact manner, the external clock signal may be a clock signal provided from the card reader. For example, the frequency of the external clock signal may have an allowable frequency range from 1 MHz to 5 MHz, and the first clock frequency FREQ1 may be measured within the allowable frequency range of the frequency of the external clock signal.

A first range among a plurality of first clock ranges CR1s may be selected based on the first clock frequency FREQ1 (S300).

In an embodiment, the plurality of first clock ranges CR1s may be determined based on the clock ranges CR11, CR12, CR13, ..., CR1m described with reference to FIG. 7. A clock range including the first clock frequency FREQ1 from among the plurality of first clock ranges CR1s may be selected as the first range.

The sensor clock signal SCLK having the second clock frequency FREQ2 corresponding to the first range may be output (S500).

In an embodiment, when the first clock frequency FREQ1 of the external clock signal and the second clock frequency FREQ2 of the sensor clock signal SCLK have the odd-numbered multiple relationship, a noise may be generated in the sensor clock signal SCLK due to the external clock signal. Accordingly, the second clock frequency FREQ2 of the sensor clock signal SCLK may be determined to be set to an even-numbered multiple of the first clock frequency FREQ1.

In an embodiment, operation S300 or S500 may be performed by the sensor clock output circuit 130 or 530 of FIG. 1 or 6.

The sensing data SDAT for biometric authentication may be output based on the sensor clock signal SCLK and first compensation image data (S700).

In an embodiment, operation S700 may be performed by the sensor circuit 150 or 550 of FIG. 1 or 12.

Figure 15:
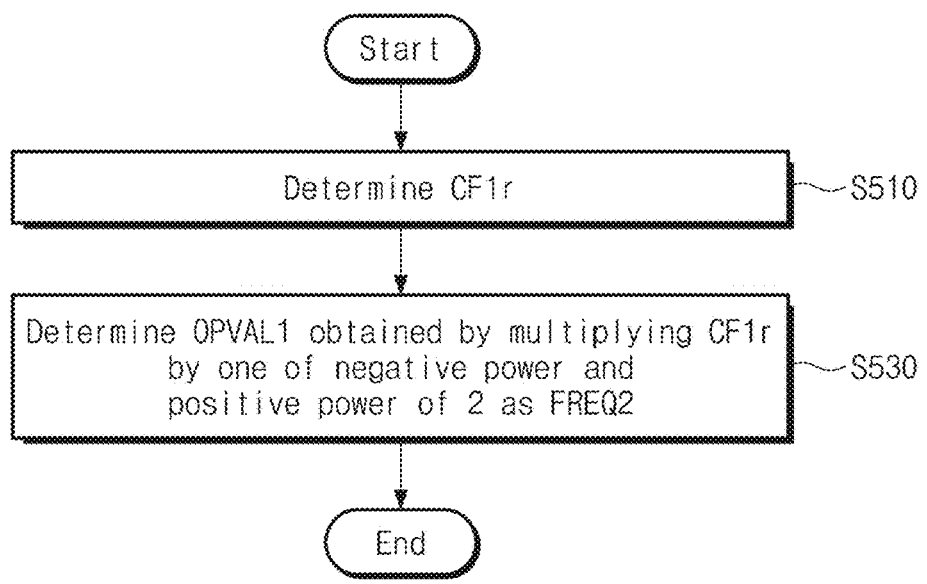
FIG. 15 is a flowchart illustrating an embodiment of an operation of outputting a sensor clock signal, which described with reference to FIG. 14.

FIG. 15 is a flowchart illustrating an embodiment of an operation of outputting a sensor clock signal, which described with reference to FIG. 14.

Referring to FIGS. 14 and 15, in operation S500, a first reference frequency CF1r corresponding to the first range may be determined (S510).

In an embodiment, the first reference frequency CF1r may correspond to the first range among the representative frequencies CF11r, CF12r, CF13r, ..., CF1mr described with reference to FIG. 8 or may be a frequency included in the first range.

The second clock frequency FREQ2 may be a first operation value OPVAL1. The first operation value OPVAL1 may be obtained by multiplying the first reference frequency CF1r by one of the positive power of 2 and the negative power of 2 based on the first reference frequency CF1r and a sensor clock range indicating an allowable frequency range for the sensor clock signal SCLK (S530).

Figure 16:
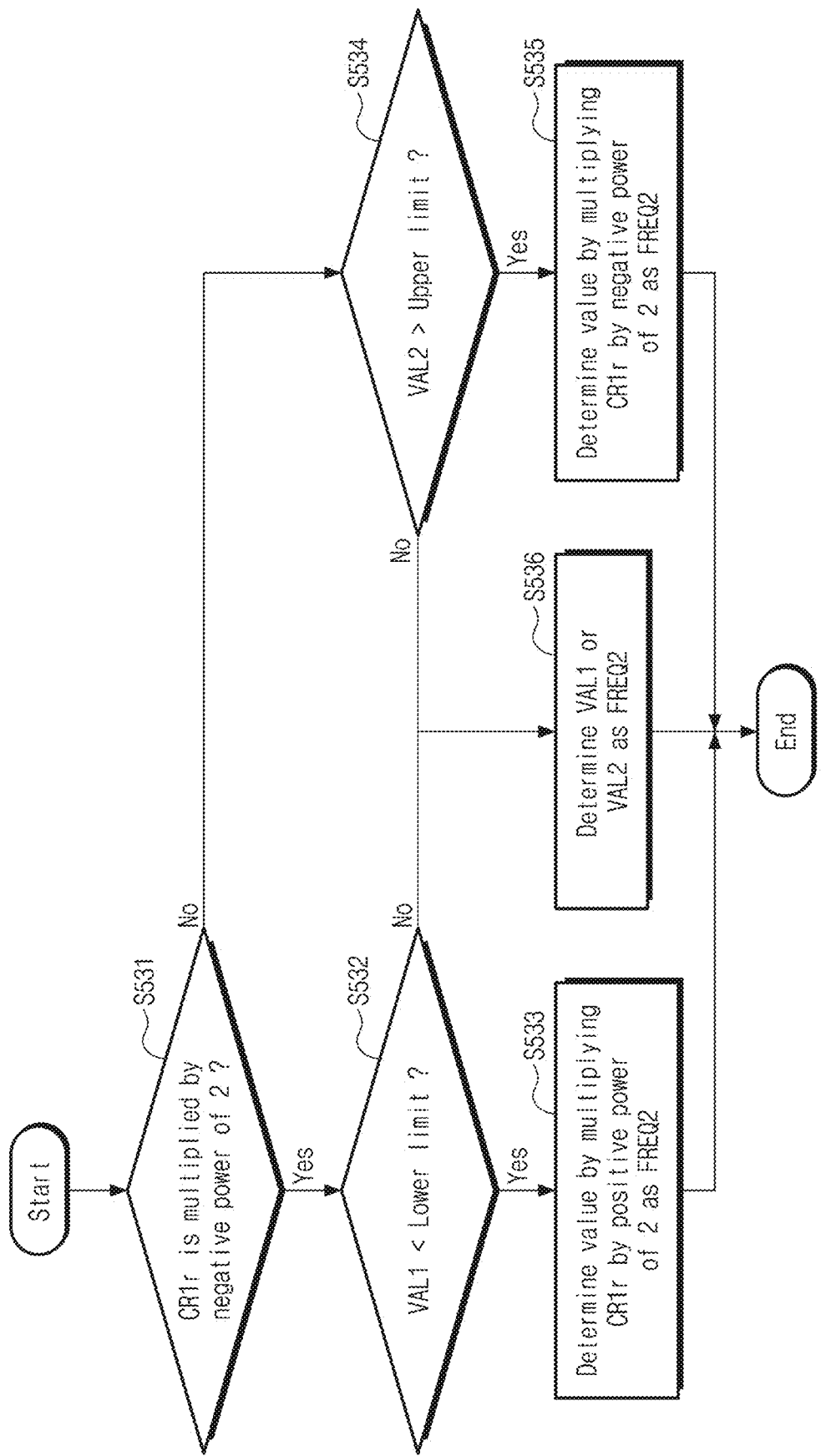
FIGS. 16, 17, and 18 are diagrams illustrating embodiments of an operation of determining a first operation value as a second clock frequency, which is described with reference to FIG. 15.
Figure 17:
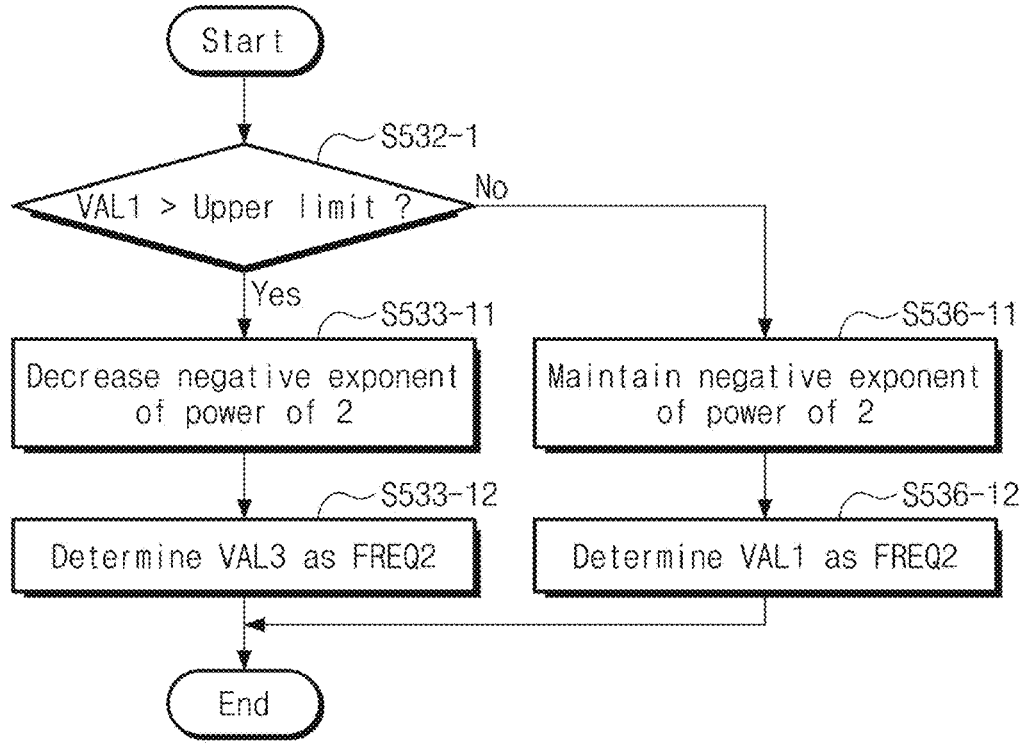
Figure 18:
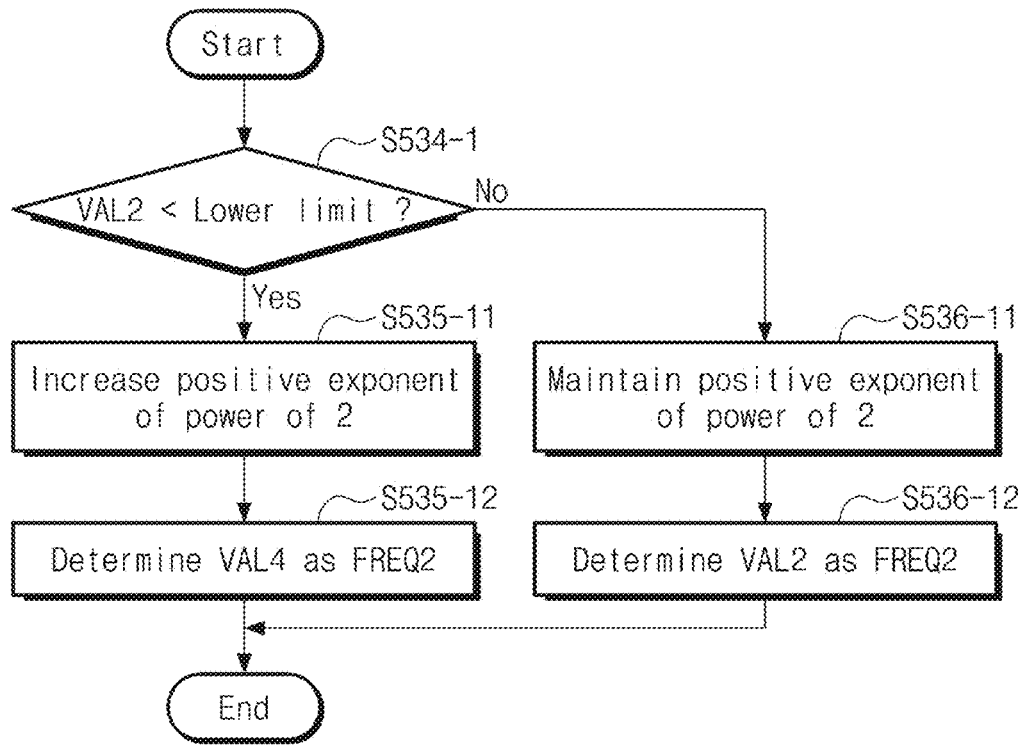

FIGS. 16, 17, and 18 are diagrams illustrating embodiments of an operation of determining a first operation value as a second clock frequency, which is described with reference to FIG. 15.

Referring to FIGS. 15 and 16, in operation S530, whether the first reference frequency CF1r is multiplied by the negative power of 2 may be determined (S531).

When the first reference frequency CF1r is multiplied by the negative power of 2 (Yes in operation S531), whether a first value VAL1 obtained by multiplying the first reference frequency CF1r by the negative power of 2 is smaller than a lower limit of a sensor clock range may be determined (S532).

When the first value VAL1 is smaller than the lower limit of the sensor clock range (referring to the "Yes" condition in operation S532), a value obtained by multiplying the first reference frequency CF1r by the positive power of 2 may be determined as the second clock frequency FREQ2 (S533).

When the first reference frequency CF1r is not multiplied by the negative power of 2 (referring to the "No" condition in operation S531), whether a second value VAL2 obtained by multiplying the first reference frequency CF1r by the positive power of 2 is greater than an upper limit of the sensor clock range may be determined (S534).

When the second value VAL2 is greater the upper limit of the sensor clock range (Yes in operation S534), a value obtained by multiplying the first reference frequency CF1r by the negative power of 2 may be determined as the second clock frequency FREQ2 (S535).

When the first value VAL1 is greater than or equal to the lower limit of the sensor clock range (No in operation S532) or when the second value VAL2 is smaller than or equal to the upper limit of the sensor clock range (No in operation S534), the second clock frequency FREQ2 may be determined as the first value VAL1 or the second value VAL2 (S536). When the first value VAL1 is greater than or equal to the lower limit of the sensor clock range (No in operation S532), the first value VAL1 may be determined as the second clock frequency FREQ2 without adjusting an exponent value of the negative power of 2; when the second value VAL2 is smaller than or equal to the upper limit of the sensor clock range (No in operation S534), the second value VAL2 may be determined as the second clock frequency FREQ2 without adjusting an exponent value of the positive power of 2.

In an embodiment, operation S531, operation S532, operation S533, operation S534, and operation S535 may correspond to the embodiments described with reference to FIG. 8 or 9.

Referring to FIGS. 15, 16, and 17, when the first value VAL1 is greater than the upper limit of the sensor clock range (Yes in operation S532-1), the exponent value of the negative power of 2 may be decreased to generate an updated negative power of 2 (S533-11). Accordingly, decreasing the exponent value of the negative power of 2, the second clock frequency FREQ2 may be a third value VAL3. The third value VAL3 may be determined by multiplying the first reference frequency CF1r by the updated negative power of 2 (S533-12).

When the first value VAL1 is smaller than or equal to the upper limit of the sensor clock range (NO in operation S532-1), the exponent value of the negative power of 2 may be maintained (S536-11), and the first value VAL1 may be determined as the second clock frequency FREQ2 (S536-12).

Referring to FIGS. 15, 16, and 18, when the second value VAL2 is smaller than the lower limit of the sensor clock range (Yes in operation S534-1), the exponent value of the positive power of 2 may be increased to generate an updated positive power of 2 (S535-11), Accordingly, the second clock frequency FREQ2 may be a fourth value VAL4. The fourth value VAL4 may be determined by multiplying the first reference frequency CF1r by the updated positive power of 2(S535-12).

When the second value VAL2 is greater than or equal to the lower limit of the sensor clock range (No in operation S534-1), the exponent value of the positive power of 2 may be maintained (S536-11), and the second clock frequency FREQ2 may be determined as the second value VAL2(S536-12).

In an embodiment, operation S532, operation S533, operation S536 of FIG. 16 may be replaced with operation S532-1, operation S533-11, operation S533-12, operation S536-11, and operation S536-12 of FIG. 17, and operation S534, operation S535, and operation S536 of FIG. 16 may be replaced with operation S534-1, operation S535-11, operation S535-12, operation S536-11, and operation S536-12. However, embodiments of the present disclosure are not limited thereto.

In an embodiment, operation S532-1, operation S533-11, operation S533-12, operation S536-11, and operation S536-12 of FIG. 17 may correspond to the embodiment described with reference to FIG. 11A, and operation S534-1, operation S535-11, operation S535-12, operation S536-11, and operation S536-12 of FIG. 18 may correspond to the embodiment described with reference to FIG. 11B.

Figure 19:
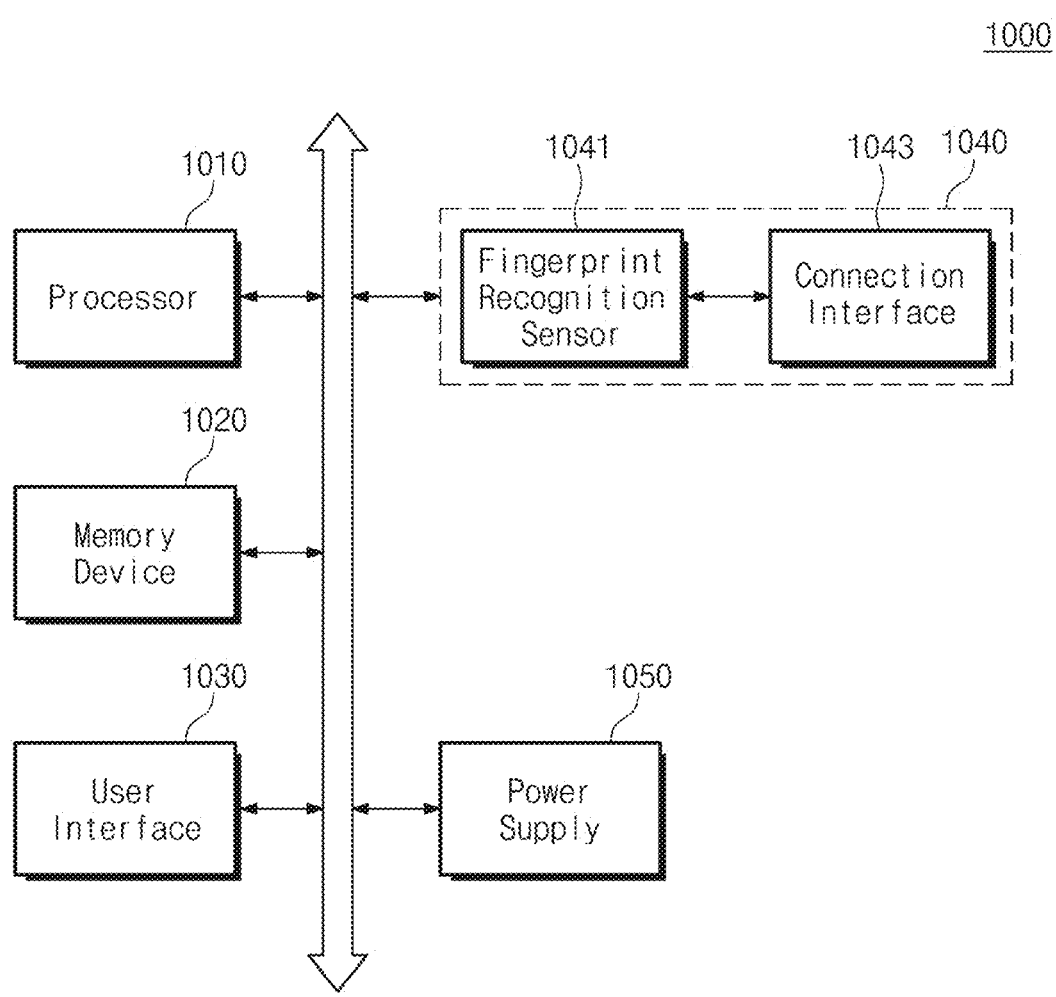
FIG. 19 is a block diagram illustrating an electronic device including a smart card according to an embodiment of the present disclosure.

FIG. 19 is a block diagram illustrating an electronic device including a smart card according to an embodiment of the present disclosure.

Referring to FIG. 19, an electronic device 1000 may include an application processor (AP) 1010, a memory device 1020, a user interface 1030, a smart card 1040, and a power supply 1050. In an embodiment, the electronic device 1000 may be an arbitrary mobile system such as a mobile phone, a smart phone, a personal digital assistant (PDA), a portable multimedia player (PMP), a digital camera, a music player, a portable game console, a navigation system, or a laptop computer.

The application processor 1010 oversees the overall operations of the electronic device 1000 and may run a variety of applications like Internet browsers, games, and videos. The application processor 1010 may have a single processing core or multiple cores, such as dual-core, quad-core, or hexa-core configurations. Additionally, in an embodiment, the application processor 1010 may further include a cache memory that is placed therein or on the external thereof.

The memory device 1020 stores data necessary for an operation of the electronic device 1000. For example, the memory device 1020 may store a boot image for booting up the electronic device 1000 and may store output data to be transmitted to an external device or input data received from the external device. For example, the memory device 1020 may implemented with an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM) or any other memory similar thereto.

The smart card 1040 may include a smart card chip 1041 and a connection interface 1043, may be provided with an external clock signal from an external card reader through the connection interface 1043 in the contact manner, and may exchange data based on the external clock signal. The smart card 1040 may adopt the smart card 100 of FIG. 1.

Accordingly, the smart card 1040 may include a frequency measurement circuit, a sensor clock output circuit, and a sensor circuit, may measure a first clock frequency of an external clock signal provided from an external card reader, and may generate or output a sensor clock signal having an even-numbered multiple relationship with the first clock frequency. For example, the frequency measurement circuit may measure a first clock frequency for the external clock signal. The sensor clock output circuit may determine a first reference frequency corresponding to a first range being a clock range including the first clock frequency from among a plurality of first clock ranges, may determine a value obtained by multiplying the first reference frequency by the power of 2 as a second clock frequency, and may output a sensor clock signal having the second clock frequency. The sensor circuit may select a second range from a plurality of second clock ranges based on the second clock frequency, may determine first compensation image data corresponding to the second range from among a plurality of compensation image data, and may generate final fingerprint image data as sensing data based on raw fingerprint image data and the first compensation image data.

The user interface 1030 may include one or more input devices such as a keypad and a touchscreen and/or one or more output devices such as a speaker and a display device. The power supply 1050 may supply an operating voltage of the electronic device 1000.

Also, in an embodiment, the electronic device 1000 may further include an image processor and may further include a storage device such as a memory card, a solid state drive (SSD), a hard disk drive (HDD), or a CDROM.

The components of the electronic device 1000 may be mounted by using packages of various shapes. For example, the electronic device 1000 may be mounted by package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), or wafer-level processed stack package (WSP).

As described above, a smart card according to embodiments of the present disclosure may have contact communication with a card reader, may receive an external clock signal from the card reader, and may measure a clock frequency of the external clock signal. When a clock frequency of a sensor clock signal has an odd-numbered multiple relationship with a clock frequency of the external clock signal, a noise may be generated in the sensor clock signal due to the external clock signal. For this reason, the smart card may select the sensor clock signal such that the clock frequency of the sensor clock signal has the even-numbered multiple relationship with the clock frequency of the external clock signal and may determine and output sensing data for biometric authentication based on the sensor clock signal. The sensor clock signal may be obtained by dividing or multiplying a system clock signal, and a compensation image corresponding to the clock frequency of the sensor clock signal may be selected in the process of generating sensing data. Accordingly, the smart card according to embodiments of the present disclosure may use the sensor clock signal capable of minimizing the noise caused by the external clock signal and may perform the sensing operation for biometric authentication by using the compensation image corresponding to the sensor clock signal, and thus, the reliability of the smart card may be increased.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A smart card comprising:
a frequency measurement circuit configured to measure a first clock frequency of an external clock signal;
a sensor clock output circuit configured to select a first range from a plurality of first clock ranges based on the first clock frequency and to output a sensor clock signal having a second clock frequency corresponding to the first range; and
a sensor circuit configured to output sensing data for biometric authentication based on the sensor clock signal and first compensation image data,
wherein the sensor clock output circuit is configured to:
determine a first reference frequency corresponding to the first range; and
determine a value for the second clock frequency by multiplying the first reference frequency by a negative power of 2 or a positive power of 2.

2. The smart card of claim 1, wherein the sensor clock output circuit is configured to:
determine an upper limit of the first range, a lower limit of the first range, or a median value between the upper limit and the lower limit as the first reference frequency.

3. The smart card of claim 1, wherein the sensor clock output circuit is configured to:
determine the value for the second clock frequency based on the first reference frequency and a sensor clock range indicating an allowable frequency range for the sensor clock signal.

4. The smart card of claim 3, wherein the sensor clock output circuit is configured to:
determine the value for the second clock frequency by multiplying the first reference frequency by the positive power of 2 when a first value obtained by multiplying the first reference frequency by the negative power of 2 is smaller than a lower limit of the sensor clock range; and
determine the value for the second clock frequency by multiplying the first reference frequency by the negative power of 2 when a second value obtained by multiplying the first reference frequency by the positive power of 2 is greater than an upper limit of the sensor clock range.

5. The smart card of claim 4, wherein the sensor clock output circuit is configured to:
determine the value for the second clock frequency by multiplying the first reference frequency by the negative power of 2 when the first value is greater than the lower limit of the sensor clock range and when the first value is smaller than the upper limit of the sensor clock range.

6. The smart card of claim 3, wherein the sensor clock output circuit is configured to perform a first operation when a first value obtained by multiplying the first reference frequency by the negative power of 2 is greater than an upper limit of the sensor clock range and to perform a second operation when a second value obtained by multiplying the first reference frequency by the positive power of 2 is smaller than a lower limit of the sensor clock range,
wherein the first operation includes:
decreasing an exponent value of the negative power of 2; and
determining a third value for the second clock frequency by multiplying the first reference frequency by a power of 2 whose exponent value is decreased, and
wherein the second operation includes:
increasing an exponent value of the positive power of 2; and
determining a fourth value for the second clock frequency by multiplying the first reference frequency by a power of 2 whose exponent value is increased.

7. The smart card of claim 6, wherein the sensor clock output circuit is configured to decrease the exponent value of the negative power of 2 until the value obtained by multiplying the first reference frequency by the negative power of 2 is smaller than the upper limit of the sensor clock range when the first value is greater than the upper limit of the sensor clock range.

8. The smart card of claim 1, wherein the sensor clock output circuit further includes:
a reference frequency determiner configured to select a clock range including the first clock frequency from among the plurality of first clock ranges as the first range and to determine a first reference frequency based on the first range;
a sensor clock frequency determiner configured to determine the second clock frequency by comparing a value obtained by multiplying the first reference frequency by a power of 2 with a sensor clock range indicating an allowable frequency range for the sensor clock signal; and
a sensor clock generator configured to generate the sensor clock signal having the second clock frequency.

9. The smart card of claim 8, wherein the sensor clock frequency determiner includes:
an exponent value adjuster configured to change an exponent value of the power of 2, when the value obtained by multiplying the first reference frequency by the power of 2 is out of the sensor clock range.

10. The smart card of claim 8, wherein the sensor clock output circuit further includes:
a sensor clock table including correspondence relationships between the plurality of first clock ranges and candidate sensor clock frequencies included in the sensor clock range indicating the allowable frequency range for the sensor clock signal.

11. The smart card of claim 1, wherein the sensor circuit includes:
a compensation image determiner configured to select a second range from a plurality of second clock ranges based on the second clock frequency of the sensor clock signal and to determine the first compensation image data corresponding to the second range from among a plurality of compensation image data; and an image data generator configured to generate final fingerprint image data as the sensing data based on raw fingerprint image data and the first compensation image data.

12. The smart card of claim 11, wherein the sensor circuit further includes:
a compensation image table including correspondence relationships between the plurality of second clock ranges and the plurality of compensation image data.

13. The smart card of claim 11, wherein the plurality of first clock ranges are determined based on an external clock range indicating an allowable frequency range for the external clock signal, and
wherein the plurality of second clock ranges are determined based on a sensor clock range indicating the allowable frequency range for the sensor clock signal.

14. The smart card of claim 1, wherein the frequency measurement circuit includes:
a first counter configured to output a first count value by counting the number of times of toggling of the external clock signal during a first time interval;
a second counter to output a second count value by counting the number of times of toggling of a system clock signal during the first time interval; and
a divider configured to output the first clock frequency based on the first count value and the second count value.

15. A method of operating a smart card, the method comprising:
measuring a first clock frequency of an external clock signal;
selecting a first range from a plurality of first clock ranges based on the first clock frequency;
outputting a sensor clock signal having a second clock frequency corresponding to the first range; and
outputting sensing data for biometric authentication based on the sensor clock signal and first compensation image data,
wherein the outputting of the sensor clock signal includes:
determining a first reference frequency corresponding to the first range; and
determining a first operation value for the second clock frequency by multiplying the first reference frequency by one of a negative power of 2 and a positive power of 2 based on the first reference frequency and a sensor clock range indicating an allowable frequency range of the sensor clock signal.

16. The method of claim 15, wherein the determining of the first operation value as the second clock frequency includes:
when a first value for the second clock frequency obtained by multiplying the first reference frequency by the negative power of 2 is smaller than a lower limit of the sensor clock range, determining a value for the second clock frequency by multiplying the first reference frequency by the positive power of 2.

17. The method of claim 15, wherein the determining of the first operation value as the second clock frequency includes:
when a first value obtained by multiplying the first reference frequency by the negative power of 2 is greater than an upper limit of the sensor clock range, determining an updated negative power of 2 by decreasing an exponent value of the negative power of 2; and
after decreasing the exponent value of the negative power of 2, determining a third value for the second clock frequency by multiplying the first reference frequency by the updated negative power of 2.

18. A smart card comprising:
a frequency measurement circuit configured to measure a first clock frequency which an external clock signal has;
a sensor clock output circuit configured to determine a first reference frequency corresponding to a first range being a clock range including the first clock frequency from among the plurality of first clock ranges, to determine a value for a second clock frequency by multiplying the first reference frequency by a power of 2 as, and to output a sensor clock signal having the second clock frequency; and
a sensor circuit configured to select a second range from a plurality of second clock ranges based on the second clock frequency, to determine first compensation image data corresponding to the second range from among a plurality of compensation image data, and to generate final fingerprint image data as sensing data based on raw fingerprint image data and the first compensation image data.

* * * * *